United States Patent
Oba et al.

(10) Patent No.: US 10,850,624 B2
(45) Date of Patent: Dec. 1, 2020

(54) CONTROL OF FUEL CONSUMPTION IN A HYBRID VEHICLE

(71) Applicant: TOYOTA JIDOSHA KABUSHIKI KAISHA, Toyota (JP)

(72) Inventors: Hidehiro Oba, Nagakute (JP); Eiji Maeda, Ashigarakami-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 297 days.

(21) Appl. No.: 15/973,092

(22) Filed: May 7, 2018

(65) Prior Publication Data

US 2019/0001958 A1    Jan. 3, 2019

(30) Foreign Application Priority Data

Jun. 28, 2017   (JP) .................................. 2017-126085

(51) Int. Cl.

| | | |
|---|---|---|
| *B60W 20/13* | (2016.01) | |
| *B60W 10/06* | (2006.01) | |
| *B60W 10/08* | (2006.01) | |
| *B60W 20/40* | (2016.01) | |
| *B60L 15/20* | (2006.01) | |

(Continued)

(52) U.S. Cl.
CPC ........... *B60L 15/2045* (2013.01); *B60L 50/16* (2019.02); *B60L 50/61* (2019.02); *B60L 58/13* (2019.02); *B60W 10/06* (2013.01); *B60W 10/08* (2013.01); *B60W 20/13* (2016.01); *B60W 20/40* (2013.01); *B60L 2240/44* (2013.01); *B60L 2260/26* (2013.01); *B60L 2270/12* (2013.01); *B60W 2050/0039* (2013.01);

(Continued)

(58) Field of Classification Search
CPC combination set(s) only.
See application file for complete search history.

(56) References Cited

U.S. PATENT DOCUMENTS

| | | | |
|---|---|---|---|
| 6,295,487 B1 * | 9/2001 | Ono ......................... | B60K 6/44 701/22 |
| 10,215,110 B2 * | 2/2019 | Okamoto ................ | F02D 29/02 |

(Continued)

FOREIGN PATENT DOCUMENTS

| | | | |
|---|---|---|---|
| JP | 2016-210348 A | 12/2016 | |
| WO | WO-2016167324 A1 * | 10/2016 | .............. H02P 9/008 |

*Primary Examiner* — Christian Chace
*Assistant Examiner* — Amelia J. I. Vorce
(74) *Attorney, Agent, or Firm* — Sughrue Mion, PLLC

(57) ABSTRACT

A vehicle includes an engine, a motor generator, a battery, and an ECU, and is configured to selectively perform EV running and engine running. When requested power is smaller than reference power, ECU calculates an engine fuel consumption ratio h1 when the engine outputs power resulting from addition of optimal charging power for the battery to the requested power, and determines whether the engine fuel consumption ratio h1 is larger than an EV criterion line resulting from addition of a margin K to a battery equivalent fuel consumption ratio F. When the engine fuel consumption ratio h1 is larger than the EV criterion line, ECU selects EV running, and otherwise selects engine running. The ECU calculates the margin K by referring to an F-K map which defines correspondence between the battery equivalent fuel consumption ratio F and the margin K with which an SOC is converged to a target range.

8 Claims, 19 Drawing Sheets

(51) Int. Cl.
  *B60L 58/13* (2019.01)
  *B60L 50/61* (2019.01)
  *B60L 50/16* (2019.01)
  *B60W 50/00* (2006.01)

(52) U.S. Cl.
  CPC . *B60W 2510/244* (2013.01); *B60W 2530/209* (2020.02); *Y10S 903/93* (2013.01)

(56) References Cited

U.S. PATENT DOCUMENTS

| | | | |
|---|---|---|---|
| 2015/0051776 A1* | 2/2015 | Gotoh | B60W 20/20 701/22 |
| 2015/0091526 A1* | 4/2015 | Tani | H02J 7/007192 320/109 |
| 2016/0052505 A1* | 2/2016 | Zhou | B60L 50/16 701/22 |
| 2017/0129359 A1* | 5/2017 | Dunlap | B60L 11/1861 |
| 2018/0222467 A1* | 8/2018 | Kaun | B60W 10/08 |
| 2018/0273022 A1* | 9/2018 | Bell | B60L 53/20 |

\* cited by examiner

J: BATTERY EQUIVALENT FUEL AMOUNT[g]
G: ENGINE FUEL CONSUMPTION RATIO DURING POWER GENERATION[g/kWh]=h/η
d: AMOUNT OF ELECTRIC POWER INPUT TO BATTERY BY ENGINE POWER GENERATION[kWh]
F: BATTERY EQUIVALENT FUEL CONSUMPTION RATIO[g/kWh]
c: AMOUNT OF ELECTRIC POWER OUTPUT FROM BATTERY[kWh]
a: BATTERY POWER STORAGE AMOUNT[kWh]
r: MG2 REGENERATIVE POWER AMOUNT[kWh]

CONTROL OF FUEL CONSUMPTION IN A HYBRID VEHICLE

This nonprovisional application is based on Japanese Patent Application No. 2017-126085 filed with the Japan Patent Office on Jun. 28, 2017, the entire contents of which are hereby incorporated by reference.

BACKGROUND

Field

The present disclosure relates to a hybrid vehicle which can run with motive power from at least one of an engine and a rotating electric machine.

Description of the Background Art

Japanese Patent Laying-Open No. 2016-210348 discloses a hybrid vehicle which includes an engine mechanically connected to a drive wheel, a motor generator mechanically connected to the drive wheel and the engine, and a battery electrically connected to the motor generator. In the hybrid vehicle, an engine fuel consumption ratio representing a ratio of an amount of fuel consumption by the engine to an amount of energy generation by the engine and a battery equivalent fuel consumption ratio representing a ratio of an amount of fuel consumed by the engine for charging of the battery to an amount of power storage in the battery are calculated. When the battery equivalent fuel consumption ratio is smaller than the engine fuel consumption ratio, electrical running in which the vehicle runs with the engine being turned off is selected, and when the engine fuel consumption ratio is smaller than the battery equivalent fuel consumption ratio on the contrary, engine running in which the vehicle runs with the engine being turned on is selected.

SUMMARY

As described above, in the hybrid vehicle disclosed in Japanese Patent Laying-Open No. 2016-210348, the engine fuel consumption ratio during engine running is simply compared with the battery equivalent fuel consumption ratio during electrical running, and running smaller in fuel consumption ratio is selected.

With the method disclosed in Japanese Patent Laying-Open No. 2016-210348, however, electrical running is selected unless the battery equivalent fuel consumption ratio exceeds the engine fuel consumption ratio. Therefore, a frequency of selection of electrical running is higher and a state of charge (an SOC) of the battery tends to be lower than a target range. Consequently, in many cases, the engine should forcibly be turned on in order to recover the SOC and a sufficient effect of improvement in fuel efficiency may not be obtained from a broad view.

The present disclosure was made to solve the above-described problem and an object thereof is to control running to optimize fuel efficiency while an SOC of a battery is stabilized in a target range in a hybrid vehicle.

(1) A hybrid vehicle according to the present disclosure includes an engine mechanically connected to a drive wheel, a motor generator mechanically connected to the drive wheel and the engine, a battery electrically connected to the motor generator, and a control device configured to select between electrical running and engine running by using an engine fuel consumption ratio and a battery equivalent fuel consumption ratio. In electrical running, the vehicle runs with the engine being turned off. In engine running, the vehicle runs with the engine being turned on. The engine fuel consumption ratio represents a ratio of an amount of fuel consumption by the engine to an amount of energy generation by the engine. The battery equivalent fuel consumption ratio represents a ratio of an amount of fuel consumed by the engine for charging of the battery to an amount of power storage in the battery. When power requested by a user is smaller than reference power at which the engine fuel consumption ratio is smallest, the control device is configured to calculate optimal charging power for the battery during the engine running, calculate the engine fuel consumption ratio as a first engine fuel consumption ratio when the engine outputs power resulting from addition of the optimal charging power to the requested power, calculate a first margin in accordance with the battery equivalent fuel consumption ratio, and select the electrical running when the first engine fuel consumption ratio is larger than a first criterion value obtained by addition of the first margin to the battery equivalent fuel consumption ratio and select the engine running when the first engine fuel consumption ratio is smaller than the first criterion value. The hybrid vehicle further includes a storage which stores first information which defines correspondence between the battery equivalent fuel consumption ratio and the first margin with which an SOC of the battery is converged to a target range. The control device is configured to calculate the first margin by referring to the first information stored in the storage.

According to the configuration, instead of simply comparing the battery equivalent fuel consumption ratio and the first engine fuel consumption ratio with each other, the control device compares the first criterion value obtained by addition of the first margin to the battery equivalent fuel consumption ratio with the first engine fuel consumption ratio, and determines whether to select electrical running (EV running) or engine running based on a result thereof. A value of the first margin with which the SOC is converged to the target range is varied by the battery equivalent fuel consumption ratio. According to the configuration, first information which defines correspondence between the battery equivalent fuel consumption ratio and the first margin with which the SOC of the battery is converged to the target range is found in advance through experiments or simulations and stored in the storage.

The control device calculates the first margin in accordance with an actual battery equivalent fuel consumption ratio by using the first information stored in the storage. Therefore, switching between electrical running and engine running can be made to optimize fuel efficiency while the SOC is stabilized in the target range. Consequently, running can be controlled to optimize fuel efficiency while the SOC of the battery is stabilized in the target range in the hybrid vehicle.

(2) In one embodiment, the control device is configured to perform first correction processing to decrease the first criterion value when the SOC of the battery is higher than the target range and to increase the first criterion value when the SOC of the battery is lower than the target range.

According to the configuration, when an actual SOC is higher than the target range, the first criterion value is decreased. Since a region where electrical running is carried out (a region where the battery discharges) is thus expanded, the SOC lowers toward the target range. On the other hand, when an actual SOC is lower than the target range, the first criterion value is increased. Since a region where engine running is carried out (that is, a region where the battery is charged with electric power generated by using motive power from the engine) is thus expanded, the SOC increases toward the target range. Consequently, the SOC can more appropriately be stabilized in the target range.

(3) In one embodiment, when the requested power is larger then the reference power, the control device is configured to calculate the engine fuel consumption ratio when the engine outputs the requested power as a second engine fuel consumption ratio, calculate a second margin in accordance with the battery equivalent fuel consumption ratio, and select first engine running with assistance by the motor generator when the second engine fuel consumption ratio is larger than a second criterion value obtained by addition of the second margin to the battery equivalent fuel consumption ratio and select second engine running without assistance by the motor generator when the second engine fuel consumption ratio is smaller than the second criterion value. The storage stores second information which defines correspondence between the battery equivalent fuel consumption ratio and the second margin with which the SOC of the battery is converged to the target range. The control device is configured to calculate the second margin by referring to the second information stored in the storage.

According to the configuration, the control device compares the second criterion value obtained by addition of the second margin to the battery equivalent fuel consumption ratio with the second engine fuel consumption ratio, and determines whether to select first engine running with assistance by the motor generator or second engine running without assistance by the motor generator based on a result thereof.

Fuel efficiency during first engine running is varied by the battery equivalent fuel consumption ratio. According to the configuration, second information which defines correspondence between the battery equivalent fuel consumption ratio and the second margin with which the SOC of the battery is converged to the target range is found in advance through experiments or simulations and stored in the storage.

The control device calculates the second margin in accordance with an actual battery equivalent fuel consumption ratio by using the second information stored in the storage. Therefore, switching between first engine running and second engine running can be made to optimize fuel efficiency while the SOC is stabilized in the target range.

(4) In one embodiment, the control device is configured to perform second correction processing to decrease the second criterion value when the SOC of the battery is higher than the target range and to increase the second criterion value when the SOC of the battery is lower than the target range.

According to the configuration, when an actual SOC is higher than the target range, the second criterion value is decreased. Since a region where first engine running with assistance by the motor generator is carried out (a region where the battery discharges) is thus expanded, the SOC lowers toward the target range. On the other hand, when an actual SOC is lower than the target range, the second criterion value is increased. Since a region where second engine running without assistance by the motor generator is carried out is thus expanded, the SOC tends to increase toward the target range owing to power generation by using motive power from the engine. Consequently, an SOC can more appropriately be stabilized in the target range.

(5) Another hybrid vehicle according to the present disclosure includes an engine mechanically connected to a drive wheel, a motor generator mechanically connected to the drive wheel and the engine, a battery electrically connected to the motor generator, and a control device configured to select between electrical running and engine running by using an engine fuel consumption ratio and a battery equivalent fuel consumption ratio. In the electrical running, the vehicle runs with the engine being turned off. In the engine running, the vehicle runs with the engine being turned on. The engine fuel consumption ratio represents a ratio of an amount of fuel consumption by the engine to an amount of energy generation by the engine. The battery equivalent fuel consumption ratio represents a ratio of an amount of fuel consumed by the engine for charging of the battery to an amount of power storage in the battery. The control device is configured to calculate optimal charging power for the battery during the engine running, calculate the engine fuel consumption ratio as a first engine fuel consumption ratio when the engine outputs power resulting from addition of the optimal charging power to power requested by a user, calculate a margin in accordance with the battery equivalent fuel consumption ratio, and select the electrical running when the first engine fuel consumption ratio is larger than a criterion value obtained by addition of the margin to the battery equivalent fuel consumption ratio and select the engine running when the first engine fuel consumption ratio is smaller than the criterion value. The hybrid vehicle further includes a storage which stores first information which defines correspondence between the battery equivalent fuel consumption ratio and the margin with which an SOC of the battery is converged to a target range. The control device is configured to calculate the margin by referring to the first information stored in the storage.

According to the configuration, the control device compares a criterion value obtained by addition of the margin to the battery equivalent fuel consumption ratio with the first engine fuel consumption ratio, and determines whether to select electrical running (EV running) or engine running based on a result thereof.

A value of the margin with which the SOC is converged to the target range is varied by the battery equivalent fuel consumption ratio. According to the configuration, information which defines correspondence between the battery equivalent fuel consumption ratio and the margin with which the SOC of the battery is converged to the target range is found in advance through experiments or simulations and stored in the storage.

The control device calculates the margin in accordance with an actual battery equivalent fuel consumption ratio by using the information stored in the storage.

Therefore, switching between electrical running and engine running can be made to optimize fuel efficiency while the SOC is stabilized in the target range. Consequently, running can be controlled to optimize fuel efficiency while the SOC of the battery is stabilized in the target range in the hybrid vehicle.

(6) In one embodiment, the control device is configured to perform correction processing to decrease the criterion value when the SOC of the battery is higher than the target range and to increase the criterion value when the SOC of the battery is lower than the target range.

According to the configuration, when an actual SOC is higher than the target range, the criterion value is decreased. Since a region where electrical running is carried out (a region where the battery discharges) is thus expanded, the SOC lowers toward the target range. When an actual SOC is lower than the target range, the criterion value is increased. Since a region where engine running is carried out (that is, a region where the battery is charged with electric power generated by using motive power from the engine) is thus expanded, the SOC increases toward the target range. Consequently, the SOC can more appropriately be stabilized in the target range.

(7) Another hybrid vehicle according to the present disclosure includes an engine mechanically connected to a drive wheel, a motor generator mechanically connected to the drive wheel and the engine, a battery electrically connected to the motor generator, and a control device configured to select between first engine running with assistance by the motor generator and second engine running without assistance by the motor generator, by using an engine fuel consumption ratio and a battery equivalent fuel consumption ratio. The engine fuel consumption ratio represents a ratio of an amount of fuel consumption by the engine to an amount of energy generation by the engine. The battery equivalent fuel consumption ratio represents a ratio of an amount of fuel consumed by the engine for charging of the battery to an amount of power storage in the battery. The control device is configured to calculate an engine fuel consumption ratio during the second engine running, calculate a margin in accordance with the battery equivalent fuel consumption ratio, and select the first engine running when the engine fuel consumption ratio during the second engine running is larger than a criterion value obtained by addition of the margin to the battery equivalent fuel consumption ratio and select the second engine running when the engine fuel consumption ratio during the second engine running is smaller than the criterion value. The hybrid vehicle further includes a storage which stores information which defines correspondence between the battery equivalent fuel consumption ratio and the margin with which an SOC of the battery is converged to a target range. The control device is configured to calculate the margin by referring to the information stored in the storage.

According to the configuration, the control device compares a criterion value obtained by addition of the margin to the battery equivalent fuel consumption ratio with the engine fuel consumption ratio during second engine running without assistance by the motor generator, and determines whether to select first engine running with assistance by the motor generator or second engine running based on a result thereof.

Fuel efficiency during first engine running is varied by the battery equivalent fuel consumption ratio. According to the configuration, second information which defines correspondence between the battery equivalent fuel consumption ratio and the margin with which the SOC of the battery is converged to the target range is found in advance through experiments or simulations and stored in the storage.

The control device calculates the margin in accordance with an actual battery equivalent fuel consumption ratio by using the second information stored in the storage. Therefore, switching between first engine running and second engine running can be made to optimize fuel efficiency while the SOC is stabilized in the target range. Consequently, running can be controlled to optimize fuel efficiency while the SOC of the battery is stabilized in the target range in the hybrid vehicle.

(8) In one embodiment, the control device is configured to perform correction processing to decrease the criterion value when the SOC of the battery is higher than the target range and to increase the criterion value when the SOC of the battery is lower than the target range.

According to the configuration, when an actual SOC is higher than the target range, the criterion value is decreased. Since a region where first engine running with assistance by the motor generator is carried out (a region where the battery discharges) is thus expanded, the SOC lowers toward the target range. When an actual SOC is lower than the target range, the criterion value is increased. Since a region where second engine running without assistance by the motor generator is carried out is thus expanded, the SOC tends to increase toward the target range owing to power generation by using motive power from the engine. Consequently, the SOC can more appropriately be stabilized in the target range.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
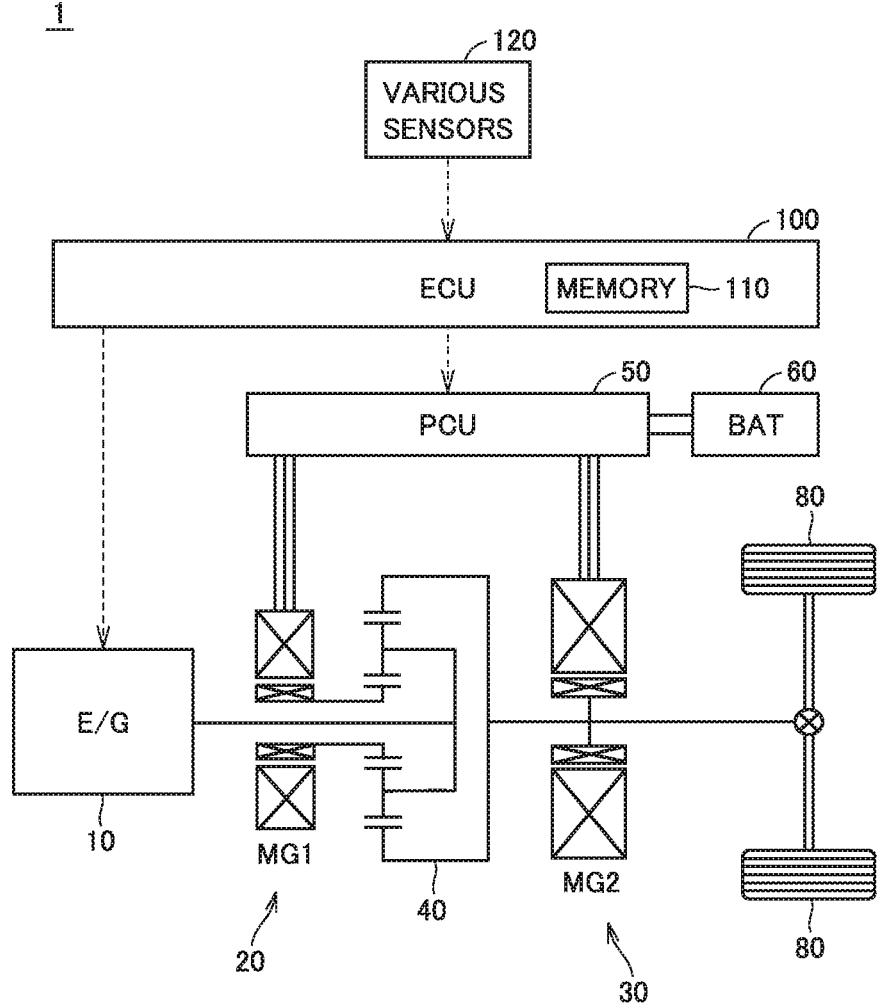
FIG. 1 is an overall configuration diagram of a vehicle.

An embodiment of the present disclosure will be described below in detail with reference to the drawings. The same or corresponding elements in the drawings have the same reference characters allotted and description thereof will not be repeated.

The term "electric power" herein may mean electric power (power) in a narrow sense and may mean an amount of electric power (a quantity of power) or electric energy which are electric power in a broad sense, and it is flexibly interpreted depending on a situation of use of the term.

<Configuration of Vehicle>

FIG. 1 is an overall configuration diagram of a vehicle 1 according to the present embodiment. Vehicle 1 includes an engine 10, a first motor generator (which is hereinafter referred to as a "first MG") 20, a second motor generator (which is hereinafter referred to as a "second MG") 30, a power split device 40, a power control unit (PCU) 50, a battery 60, a drive wheel 80, and an electronic control unit (ECU) 100.

Vehicle 1 is what is called a split type hybrid vehicle including engine 10 and two motor generators (first MG 20 and second MG 30). The vehicle to which the present disclosure is applicable is not limited to vehicle 1 shown in FIG. 1. For example, the present disclosure is applicable also to a general series type or parallel type hybrid vehicle including an engine and a single motor generator.

Vehicle 1 is configured to selectively carry out "EV running" (electrical running) in which the vehicle runs with motive power from second MG 30 with engine 10 being turned off and "engine running" in which the vehicle runs with motive power from engine 10 with engine 10 being turned on. Engine running includes "first engine running" with assistance by second MG 30 (which is hereinafter also referred to as "motor assistance") and "second engine running" without motor assistance.

Engine 10 is an internal combustion engine which outputs motive power by converting combustion energy generated at the time of combustion of an air-fuel mixture of air and fuel into kinetic energy of a motion element such as a piston and a rotor. Power split device 40 includes, for example, a planetary gear including three rotation axes of a sun gear, a carrier, and a ring gear. Power split device 40 splits motive power output from engine 10 into motive power for driving first MG 20 and motive power for driving drive wheel 80.

First MG 20 and second MG 30 are each an alternating-current (AC) rotating electric machine, and they are, for example, three-phase AC synchronous motors each having a permanent magnet embedded in a rotor. First MG 20 is mainly used as a power generator driven by engine 10 with power split device 40 being interposed. Power generation by first MG 20 with fuel consumption by engine 10 is also referred to as "engine power generation" and electric power generated by first MG 20 in engine power generation is also referred to as "engine generated electric power." Engine generated electric power is supplied to second MG 30 or battery 60 through PCU 50. Electric power can be generated by the engine during engine running described above (first engine running or second engine running).

Second MG 30 mainly operates as a motor and drives drive wheel 80. Second MG 30 is driven upon receiving at least one of electric power from battery 60 and electric power generated by first MG 20, and driving force from second MG 30 is transmitted to drive wheel 80. During braking or deceleration on a downward slope of vehicle 1, second MG 30 carries out regeneration as being driven by rotation energy from drive wheel 80 (operation energy of vehicle 1). Regenerative power generated by second MG 30 is also referred to as "MG2 regenerative power." MG2 regenerative power is collected into battery 60 through PCU 50. Therefore, battery 60 stores both of electric power (engine generated electric power) obtained by using fuel for engine 10 and electric power (MG2 regenerative power) obtained by using operation energy of vehicle 1 without using fuel for engine 10.

PCU 50 converts direct-current (DC) power received from battery 60 into AC power for driving first MG 20 and second MG 30. PCU 50 converts AC power generated by first MG 20 and second MG 30 into DC power for charging battery 60. PCU 50 includes, for example, two inverters provided in correspondence with first MG 20 and second MG 30, respectively, and a converter which boosts a DC voltage supplied to each inverter to a voltage not lower than a voltage of battery 60.

Battery 60 is a rechargeable DC power supply and it includes, for example, a secondary battery such as a lithium ion battery or a nickel-metal hydride battery. Battery 60 is charged upon receiving electric power generated by at least one of first MG 20 and second MG 30. Battery 60 supplies stored electric power to PCU 50. An electric double layer capacitor or the like can also be adopted as battery 60.

Vehicle 1 further includes various sensors 120. Various sensors 120 include, for example, an accelerator position sensor which detects an amount of operation of the accelerator by a user, a rotation speed sensor which detects a rotation speed of engine 10, a vehicle speed sensor which detects a vehicle speed, and a monitoring unit which detects a state of battery 60 (a voltage, input and output currents, and a temperature). Various sensors 120 output results of detection to ECU 100.

ECU 100 includes a central processing unit (CPU), a memory 110 which stores a processing program, input and output ports (not shown) for input and output of various signals, and performs prescribed operation processing based on information stored in memory 110 and information from various sensors 120. ECU 100 controls each of engine 10, PCU 50, and the like based on a result of operation processing.

<Calculation of Battery Equivalent Fuel Consumption Ratio>

ECU 100 according to the present embodiment calculates a "battery equivalent fuel consumption ratio F" as an indicator indicating quality of electric power stored in battery 60. Battery equivalent fuel consumption ratio F is expressed as a ratio (a unit of g/kWh) of an amount of fuel consumed by engine 10 for charging of battery 60 to a total amount of electric power stored in battery 60. In other words, battery equivalent fuel consumption ratio F is an indicator which indicates how many grams of fuel for engine 10 are consumed for consuming a unit amount (1 kWh) of energy of battery 60.

Electric power stored in battery 60 refers to a total sum of engine generated electric power described above (electric power obtained by using fuel for engine 10) and MG2 regenerative power described above (electric power obtained without using fuel for engine 10). In calculating battery equivalent fuel consumption ratio F, fuel corresponding to engine generated electric power in charging of battery 60 with engine generated electric power is also stored together in battery 60, and in output of electric power from battery 60, fuel corresponding to that output electric power is also handled as being consumed together.

Figure 2:
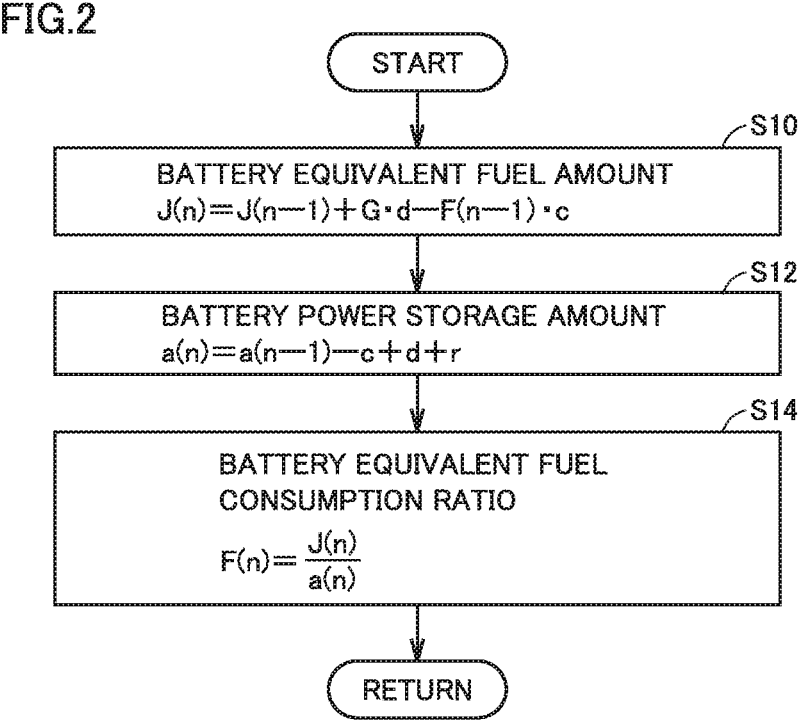
FIG. 2 is a flowchart (No. 1) showing one example of a procedure of processing by an ECU.

FIG. 2 is a flowchart showing one example of a procedure of processing performed at the time when ECU 100 calculates battery equivalent fuel consumption ratio F. The flowchart is repeatedly executed with a prescribed cycle.

In a step (hereinafter a step being abbreviated as "S") 10, ECU 100 calculates a battery equivalent fuel amount J(n) (a unit of g) in a present cycle by using an expression (1) as follows:

$$J(n)=J(n-1)+G \cdot d-F(n-1) \cdot c \quad (1)$$

where "J(n−1)" represents a battery equivalent fuel amount J (a unit of g) in a previous cycle, "d" represents an amount of electric power (a unit of kWh) input to battery 60 as a result of power generation by the engine from the previous cycle until the present cycle, and "G" represents a fuel consumption ratio (a unit of g/kWh) of engine 10 during power generation by the engine from the previous cycle until the present cycle. "G" represents a value in consideration of a loss in an electric system and is expressed as G=h/η where h represents an engine fuel consumption ratio and $r_1$ represents efficiency of the electric system which will be described later. "G·d" in the expression (1) represents an equivalent amount of fuel (a unit of g) input to battery 60 from the previous cycle until the present cycle.

"c" represents an amount of electric power (a unit of kWh) output from battery 60 from the previous cycle until the present cycle. "F(n−1)" represents battery equivalent fuel consumption ratio F (a unit of g/kWh) in the previous cycle. Therefore, "F(n−1)·c" in the expression (1) represents an equivalent amount of fuel (a unit of g) output from battery 60 from the previous cycle until the present cycle.

Then, ECU 100 calculates a battery power storage amount a(n) (a unit of kWh) in the present cycle (S12) by using an expression (2) as follows:

$$a(n)=a(n-1)-c+d+r \quad (2)$$

where "a(n−1)" represents a battery power storage amount (a unit of kWh) in the previous cycle, "c" represents an amount of electric power (a unit of kWh) output from battery 60 from the previous cycle until the present cycle as described above, "d" represents an amount of electric power (a unit of kWh) input to battery 60 as a result of power generation by the engine from the previous cycle until the present cycle as described above, and "r" represents an amount of electric power (a unit of kWh) input to battery 60 as a result of MG2 regeneration from the previous cycle until the present cycle. Battery power storage amount a is calculated in consideration of the amount of electric power (=c) output from battery 60, the amount of electric power (=d) input to battery 60 as a result of power generation by the engine, and the amount of electric power (=r) input to battery 60 as a result of MG2 regeneration.

Then, ECU 100 calculates a value obtained by division of battery equivalent fuel amount J(n) in the present cycle calculated in S10 by battery power storage amount a(n) in the present cycle calculated in S12 as battery equivalent fuel consumption ratio F(n) in the present cycle (a unit of g/kWh) (S14) as shown in an expression (3) as follows.

$$F(n)=J(n)/a(n) \quad (3)$$

When the amount of electric power (=r) input to battery 60 as a result of MG2 regeneration increases, "battery equivalent fuel amount J(n)" calculated in the expression (1) does not increase whereas "battery power storage amount a(n)" calculated in the expression (2) increases. Consequently, "battery equivalent fuel consumption ratio F(n)" (=J(n)/a(n)) calculated in the expression (3) decreases. Therefore, as the amount of electric power (=r) input to battery 60 as a result of MG2 regeneration is greater, battery equivalent fuel consumption ratio F takes a smaller value.

<Engine Power Control>

Figure 3:
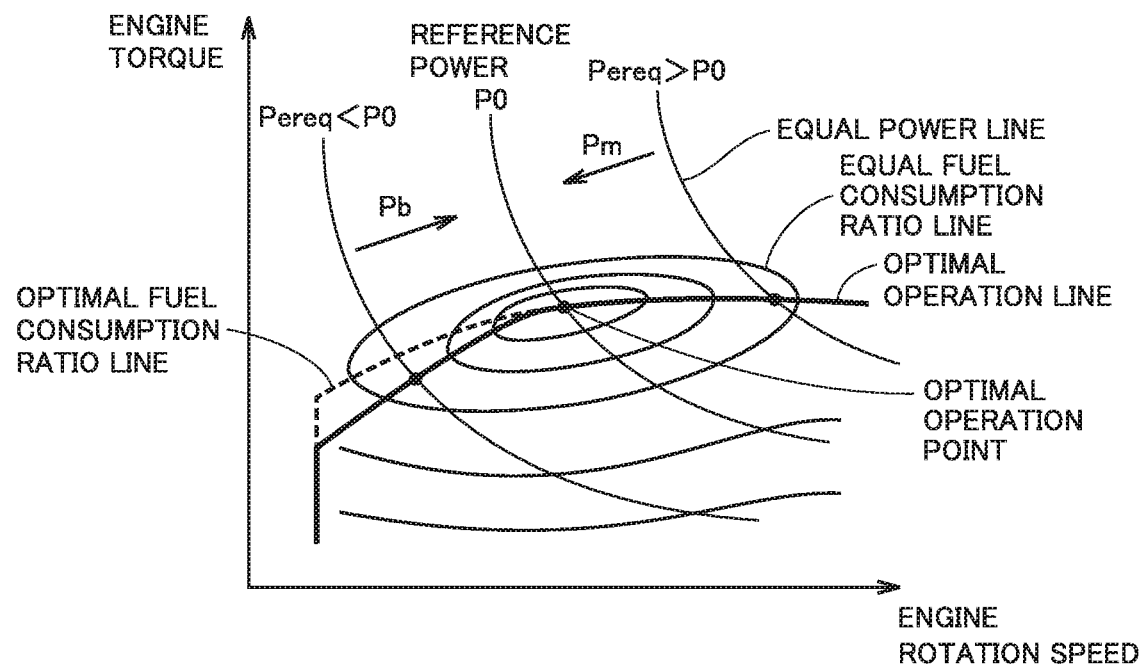
FIG. 3 is a diagram for illustrating one example of engine power control.

FIG. 3 is a diagram for illustrating one example of engine power control carried out by ECU 100 according to the present embodiment.

In FIG. 3, the abscissa represents a rotation speed of engine 10 (which is hereinafter also referred to as an "engine rotation speed") and the ordinate represents torque of engine 10 (which is hereinafter also referred to as "engine torque"). Therefore, FIG. 3 shows a state of operation of engine 10 determined by an engine rotation speed and engine torque (which is hereinafter referred to as an "engine operation point").

An "equal fuel consumption ratio line" shown in FIG. 3 is a line drawn by connecting engine operation points equal in engine fuel consumption ratio h to one another. Engine fuel consumption ratio h is expressed as an engine fuel consumption ratio (a unit of g/kWh) representing a ratio of an amount of fuel consumption by engine 10 to an amount of energy generation by engine 10. In other words, engine fuel consumption ratio h is an amount of fuel required for engine 10 to generate a unit amount (1 kWh) of power. An equal fuel consumption ratio line smaller in area of an ellipse indicates a value higher in thermal efficiency of engine 10 and smaller in engine fuel consumption ratio h. Therefore, a region surrounded by the elliptical equal fuel consumption ratio line on an innermost side refers to a region smallest in engine fuel consumption ratio h.

An "optimal fuel consumption ratio line" shown in FIG. 3 is a line drawn by connecting engine operation points at which engine fuel consumption ratio h is smallest for each engine rotation speed to one another. An "optimal operation line" shown in FIG. 3 is an operation line of engine 10 predetermined by a designer such that noise and vibration (NV) of engine 10 are not generated in a low-rotation speed region with the optimal fuel consumption ratio line being defined as the reference. ECU 100 controls an engine rotation speed and engine torque such that engine 10 is operated on the optimal operation line.

Since engine power is determined by a product of an engine rotation speed and engine torque, engine power can be expressed with an inverse proportional curve in FIG. 3. When engine power at which thermal efficiency of engine 10 attains to an optimal value is defined as "reference power P0," an intersection between the inverse proportional curve representing reference power P0 and the optimal operation line indicates an optimal operation point at which engine fuel consumption ratio h is smallest.

Figure 4:
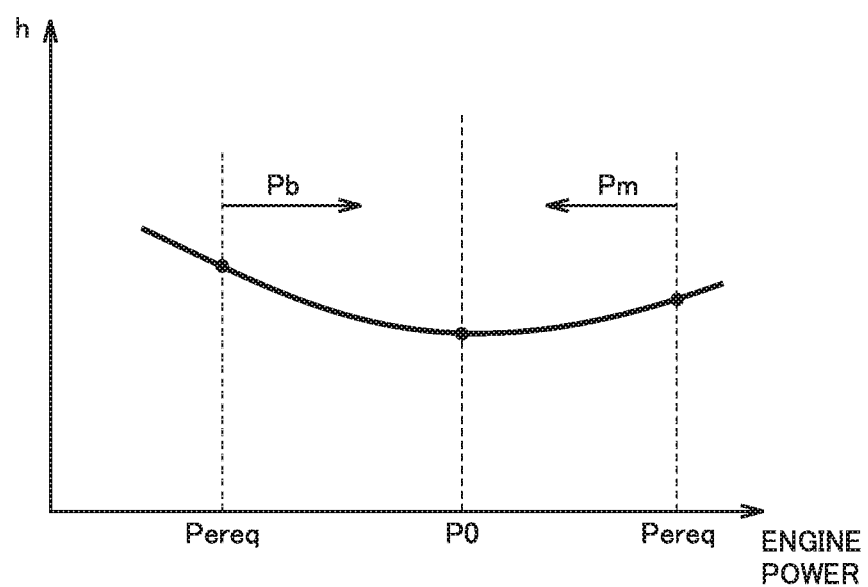
FIG. 4 is a diagram showing correspondence between engine power and an engine fuel consumption ratio h.

FIG. 4 is a diagram showing correspondence between engine power and engine fuel consumption ratio h when engine 10 is operated on the optimal operation line. As shown in FIG. 4, engine fuel consumption ratio h attains to a smallest value when engine power is equal to reference power P0 and takes a greater value as engine power deviates from reference power P0.

Therefore, with power requested for vehicle 1 by a user (which is hereinafter referred to as "requested power Pe") deviating from reference power P0, when engine power is set as it is as requested power Pe, engine fuel consumption ratio h cannot be at a smallest value.

When requested power Pe deviates from reference power P0, ECU 100 according to the present embodiment brings engine power closer to reference power P0 (that is, brings engine fuel consumption ratio h to the smallest value) by adding charging power for battery 60 to requested power Pe or subtracting output power from battery 60 from requested power Pe.

Specifically, when requested power Pe is smaller than reference power P0, ECU 100 sets a value resulting from addition of "engine generated power Pb" to requested power Pe (=Pe+Pb) as engine power. "Engine generated power Pb" refers to engine power used for power generation by the engine for charging battery 60. Thus, when a condition of Pe<P0 is satisfied, engine power can be brought closer to reference power P0 by setting "Pe+Pb" as engine power. An amount of engine power corresponding to requested power Pe is converted to energy for running of vehicle 1 and an amount of engine power corresponding to engine generated power Pb is converted to electric power for charging of battery 60.

When requested power Pe is larger than reference power P0, ECU 100 sets a value resulting from subtraction of "motor assistance power Pm" from requested power Pe (=Pe−Pm) as engine power. "Motor assistance power Pm" refers to power for running assisted by second MG 30 driven by using electric power from battery 60. Thus, when a condition of Pe>P0 is satisfied, "Pe−Pm" is set as engine power so that engine power can be brought closer to reference power P0. Power for running corresponding to requested power Pe is obtained from both of engine power and motor assistance power Pm.

<Optimal Charging Control and Optimal Discharging Control>

As described above, when requested power Pe deviates from reference power P0, ECU 100 according to the present embodiment sets a value resulting from addition of engine generated power Pb to requested power Pe as engine power or sets a value resulting from subtraction of motor assistance power Pm from requested power Pe as engine power, to thereby bring engine power closer to reference power P0. ECU 100 searches for (calculates) engine generated power Pb or motor assistance power Pm at which an amount of fuel consumption in the whole vehicle (which is hereinafter also referred to as a "vehicle fuel consumption amount Q") is optimized and sets engine power by using a result of search.

Specifically, when requested power Pe is smaller than reference power P0, ECU 100 calculates an optimal value of engine generated power Pb with a state of vehicle 1 being defined as a parameter, and sets a value resulting from addition of the optimal value of engine generated power Pb to requested power Pe as engine power (optimal charging control).

When requested power Pe is smaller than reference power P0, ECU 100 calculates an optimal value of motor assistance power Pm with a state of vehicle 1 being defined as a parameter, and sets a value resulting from subtraction of the optimal value of motor assistance power Pm from requested power Pe as engine power (optimal discharging control).

One example of a technique of calculating an optimal value of engine generated power Pb and an optimal value of motor assistance power Pm will be described below.

«Calculation of Optimal Value of Engine Generated Power Pb»

One example of a technique of calculating an optimal value of engine generated power Pb will initially be described. As described above, when requested power Pe is smaller than reference power P0, a value resulting from addition of engine generated power Pb to requested power Pe (=Pe+Pb) is set as engine power. Therefore, an actual amount q1 of fuel consumption by engine 10 when requested power Pe is smaller than reference power P0 is expressed in an expression (4) as follows:

$$q1 = h \cdot (Pe+Pb) = h \cdot Pe + h \cdot Pb \tag{4}$$

where "h·Pe" represents an amount of fuel consumption by engine 10 used for running of the vehicle and "h·Pb" represents an amount of fuel consumption by engine 10 used for power generation by the engine.

Amount of fuel consumption "h·Pb" used for power generation by the engine is stored in battery 60 after it is converted to electric power. A value resulting from multiplication of engine generated power Pb by efficiency in electric system η (=Pb·η) represents electric power input to battery 60 as a result of consumption of fuel. A value resulting from multiplication of engine fuel consumption ratio h by engine generated power Pb (=h·Pb) represents an amount of fuel consumed by engine 10 for charging of battery 60 and this value is handled as an equivalent fuel amount input to battery 60.

The equivalent fuel amount stored in battery 60 is represented by a value obtained by conversion of electric power (=Pb·η) input to the battery as a result of consumption of fuel into an equivalent fuel consumption amount at the time of output from battery 60. Therefore, the equivalent fuel consumption amount stored in battery 60 is represented by a value (=F·Pb·η) resulting from multiplication of electric power (=Pb·η) input to the battery as a result of consumption of fuel by battery equivalent fuel consumption ratio F at that time point.

Vehicle fuel consumption amount Q in consideration of both of actual amount q1 of fuel consumption by engine 10 and an equivalent fuel consumption amount stored in battery 60 (which is hereinafter referred to as a "vehicle fuel consumption amount Q1") can be expressed in an expression (5) as follows.

$$Q1 = h \cdot (Pe+Pb) - F \cdot Pb \cdot \eta \tag{5}$$

Figure 5:
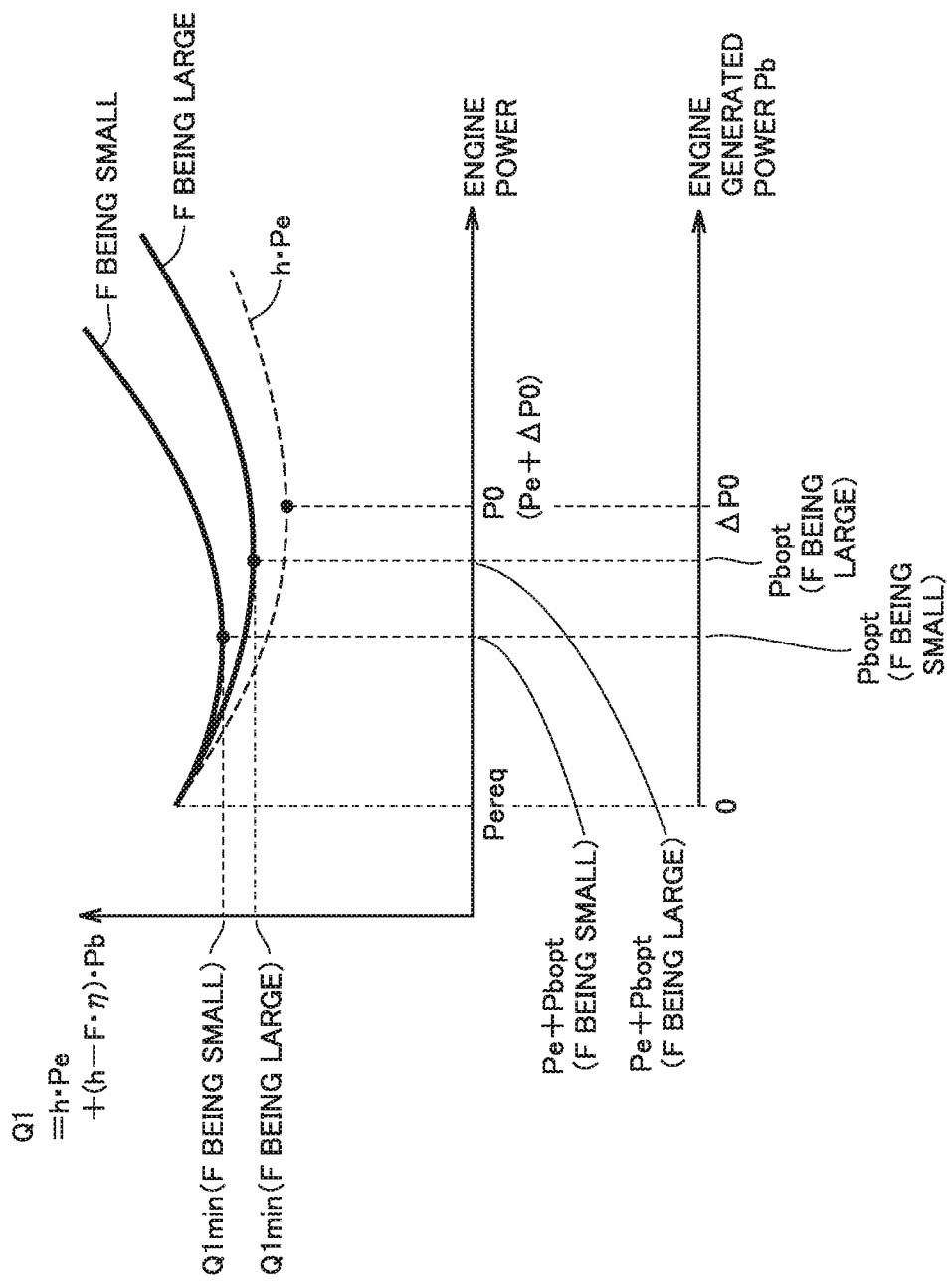
FIG. 5 is a diagram schematically showing one example of correspondence among engine power, engine generated power Pb, and a vehicle fuel consumption amount Q1.

FIG. 5 is a diagram schematically showing one example of correspondence among engine power, engine generated power Pb, and vehicle fuel consumption amount Q1. As can be understood from a waveform shown in FIG. 5, vehicle fuel consumption amount Q1 attains to a smallest value Q1min at the time when engine generated power Pb attains to a certain value with increase in engine generated power Pb from 0 (that is, with increase in engine power from requested power Pe). Engine generated power Pb at the time when vehicle fuel consumption amount Q1 attains to smallest value Q1min is an optimal value of engine generated power Pb (which is hereinafter also referred to as "optimal engine generated power Pbopt").

As can further be understood from the waveform shown in FIG. 5, optimal engine generated power Pbopt takes a value smaller than a difference ΔP0 between requested power Pe and reference power P0, which means that an amount of fuel consumption in the whole vehicle is suppressed by setting engine power to "Pe+Pbopt" smaller than reference power P0 rather than simply by setting engine power to reference power P0 (=Pe+ΔP0).

As can further be understood from the waveform shown in FIG. 5, optimal engine generated power Pbopt when battery equivalent fuel consumption ratio F is small takes a value smaller than optimal engine generated power Pbopt when battery equivalent fuel consumption ratio F is large, which means that an amount of fuel consumption is suppressed in the whole vehicle by setting engine generated power Pb to be smaller as an MG2 regeneration amount is greater and battery equivalent fuel consumption ratio F is smaller.

In view of the above, when requested power Pe is smaller than reference power P0 and engine running is carried out, ECU 100 according to the present embodiment calculates optimal engine generated power Pbopt described above by referring to a map or the like and has engine 10 output a value resulting from addition of optimal engine generated power Pbopt to requested power Pe (=Pe+Pbopt). Such a series of control procedures is referred to as optimal charging control.

《Calculation of Optimal Value of Motor Assistance Power Pm》

A technique of calculating an optimal value of motor assistance power Pm will now be described. As described above, when requested power Pe is larger than reference power P0, a value resulting from subtraction of motor assistance power Pm from requested power Pe (=Pe−Pm) is set as engine power. Therefore, an actual amount of fuel consumption q2 by engine 10 at the time when requested power Pe is larger than reference power P0 is expressed in an expression (6) as follows.

$$q2 = h \cdot (Pe - Pm) \quad (6)$$

Since motor assistance power Pm is power for running assisted by second MG 30, a value resulting from division of motor assistance power Pm by efficiency in electric system η (=PM/η) is defined as electric power output from battery 60 for obtaining motor assistance power Pm, and a value resulting from multiplication of the value by battery equivalent fuel consumption ratio F (=F·Pm/η) represents an equivalent fuel amount output from battery 60.

Therefore, vehicle fuel consumption amount Q in consideration of both of actual amount q2 of fuel consumption by engine 10 and an equivalent fuel consumption amount output from battery 60 (which is hereinafter referred to as a "vehicle fuel consumption amount Q2") can be expressed in an expression (7) as follows.

$$Q2 = h \cdot (Pe - Pm) + F \cdot Pm / \eta \quad (7)$$

Figure 6:
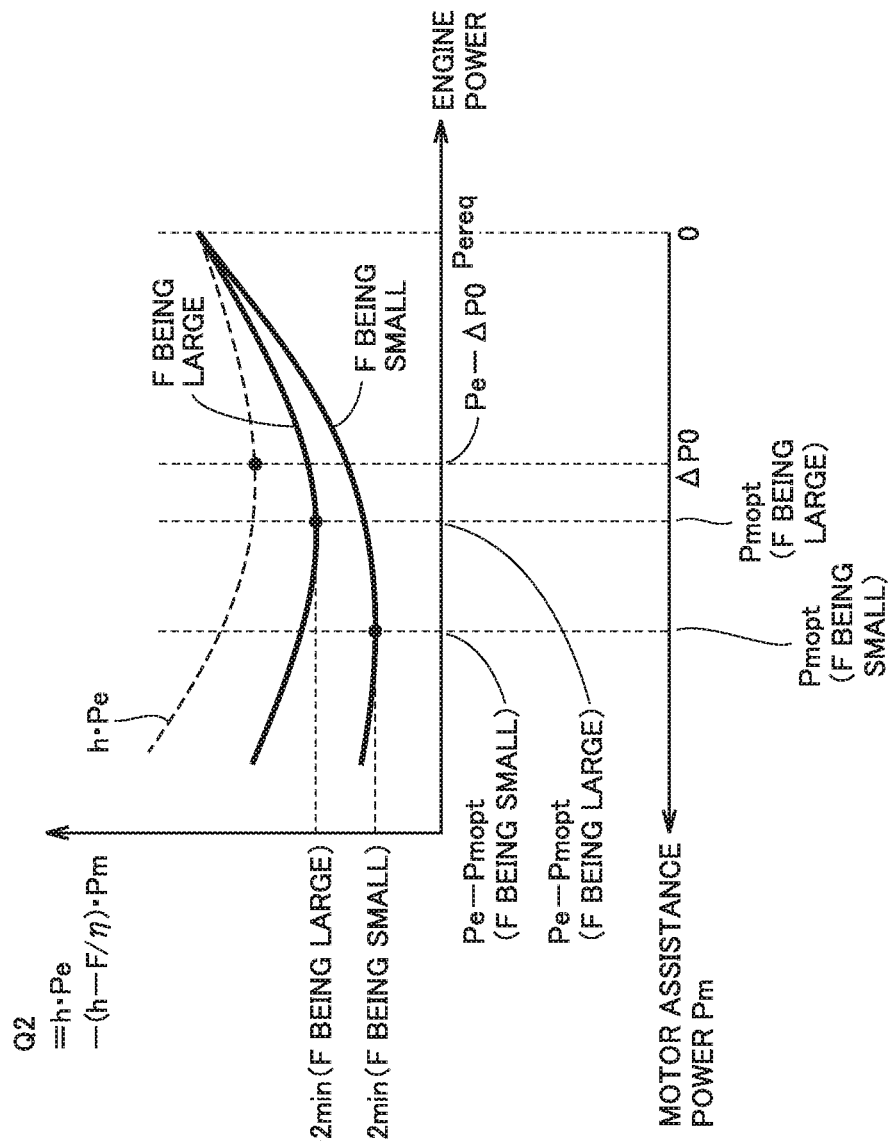
FIG. 6 is a diagram schematically showing one example of correspondence among engine power, motor assistance power Pm, and a vehicle fuel consumption amount Q2.

FIG. 6 is a diagram schematically showing one example of correspondence among engine power, motor assistance power Pm, and vehicle fuel consumption amount Q2. As can be understood from a waveform shown in FIG. 6, vehicle fuel consumption amount Q2 attains to a smallest value Q2min at the time when motor assistance power Pm attains to a certain value with increase in motor assistance power Pm from 0 (that is, decrease in engine power from requested power Pe). Motor assistance power Pm at the time when vehicle fuel consumption amount Q2 attains to smallest value Q2min is defined as "optimal motor assistance power Pmopt."

As can further be understood from the waveform shown in FIG. 6, optimal motor assistance power Pmopt takes a value greater than difference ΔP0 between requested power Pe and reference power P0, which means that an amount of fuel consumption can be suppressed in the whole vehicle by setting engine power to "Pe−Pmopt" smaller than reference power P0 rather than simply by setting engine power to reference power P0 (=Pe−ΔP0).

As can further be understood from the waveform shown in FIG. 6, optimal motor assistance power Pmopt at the time when battery equivalent fuel consumption ratio F is small takes a value greater than optimal motor assistance power Pmopt at the time when battery equivalent fuel consumption ratio F is large, which means that an amount of fuel consumption can be suppressed in the whole vehicle by setting larger motor assistance power Pm as an MG2 regeneration amount is greater and battery equivalent fuel consumption ratio F is smaller.

In view of the above, when ECU 100 according to the present embodiment carries out "first engine running" with motor assistance, ECU 100 calculates optimal motor assistance power Pmopt described above by referring to a map or the like and has engine 10 output a value resulting from subtraction of optimal motor assistance power Pmopt from requested power Pe. Such a series of control procedures is referred to as optimal discharging control.

<EV Determination Processing and Setting of Optimal EV Criterion Line>

As described above, vehicle 1 is configured to selectively carry out EV running and engine running. When requested power Pe is smaller than reference power P0, ECU 100 performs processing for selecting either EV running or engine running (which is hereinafter also referred to as "EV determination processing"). Specifically, ECU 100 calculates engine fuel consumption ratio h (which is hereinafter simply also referred to as an "engine fuel consumption ratio h1") when it is assumed that engine running is carried out with engine power (=Pe+Pbopt) obtained in optimal charging control described above, and carries out engine running when engine fuel consumption ratio h1 is smaller than a prescribed threshold value (which is hereinafter also referred to as an "EV criterion line") and carries out EV running when engine fuel consumption ratio h1 is larger than the EV criterion line.

A technique of simply setting the "EV criterion line" to be compared with engine fuel consumption ratio h1 in the EV determination processing to "battery equivalent fuel consumption ratio F" during EV running has conventionally been known.

With this technique, however, EV running is selected until battery equivalent fuel consumption ratio F increases to be close to engine fuel consumption ratio h1. Therefore, a frequency of selection of EV running is high and an SOC of battery 60 tends to be lower than a target range. Consequently, engine 10 may forcibly be turned on in order to recover the SOC and a sufficient effect of improvement in fuel efficiency may not be obtained from a broad view.

Instead of simply setting the "EV criterion line" to be compared with engine fuel consumption ratio h1 in the EV determination processing to battery equivalent fuel consumption ratio F, ECU 100 according to the present embodiment sets the EV criterion line to a value resulting from addition of an EV switching margin K to battery equivalent fuel consumption ratio F (=F+K). Thus, a frequency of selection of EV running is lowered.

As a result of running with the EV criterion line being set to "F+K" and switching between EV running and engine running being made as above, the SOC is desirably accommodated in the target range. In view of this aspect, in the present embodiment, an F-K map which defines correspondence between battery equivalent fuel consumption ratio F and EV switching margin K with which an SOC is converged to the target range is stored in advance in memory 110 of ECU 100. The F-K map can be obtained by conducting experiments or simulations for each operation pattern different in battery equivalent fuel consumption ratio F to thereby find EV switching margin K with which an SOC is converged to the target range.

Figure 7:
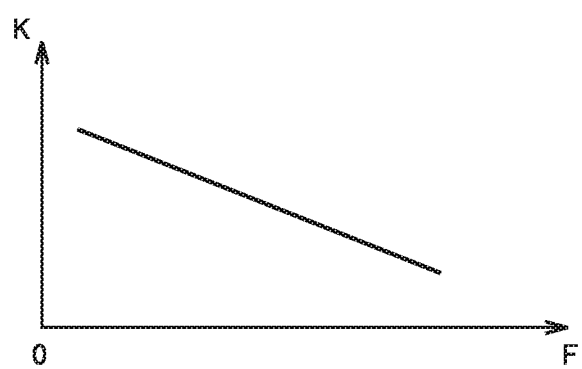
FIG. 7 is a diagram showing one example of an F–K map.

FIG. 7 is a diagram showing one example of an F-K map. As shown in FIG. 7, EV switching margin K with which an SOC is converged to the target range takes a positive value and takes a smaller value as battery equivalent fuel consumption ratio F is greater. Such an "F-K map" is stored in advance in memory 110.

ECU 100 calculates EV switching margin K in accordance with a value of current battery equivalent fuel consumption ratio F by referring to the F-K map (FIG. 7) stored in advance in memory 110. ECU 100 sets a value resulting from addition of EV switching margin K to battery equivalent fuel consumption ratio F (=F+K) as the EV criterion line.

Figure 8:
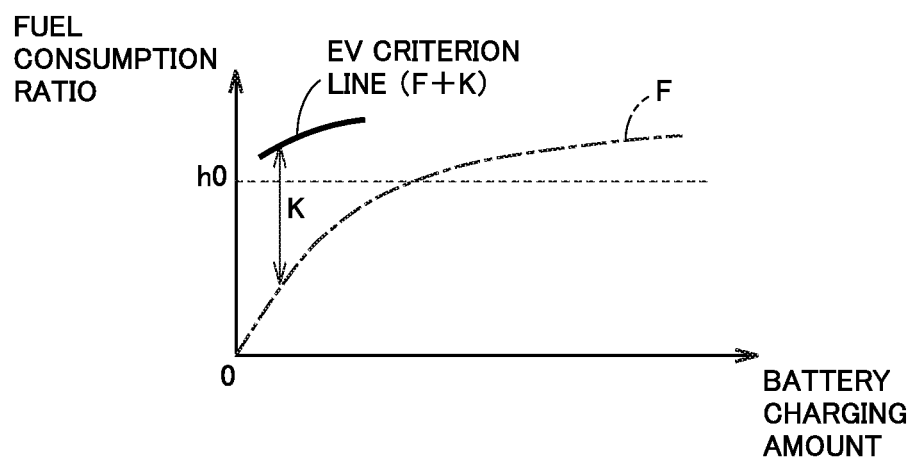
FIG. 8 is a diagram showing one example of correspondence among a battery charging amount, a battery equivalent fuel consumption ratio F, and an EV criterion line in a running pattern relatively great in MG2 regenerative power amount.

FIG. 8 is a diagram showing one example of correspondence among a battery charging amount, battery equivalent fuel consumption ratio F, and the EV criterion line (=F+K) in a running pattern relatively great in MG2 regenerative power amount (for example, an example in which the vehicle runs in an urban area). In FIG. 8, the abscissa represents a battery charging amount (a unit of kWh) and the ordinate represents a fuel consumption ratio (a unit of g/kWh). "h0" shown in FIG. 8 represents a smallest value of engine fuel consumption ratio h, which is also applicable to FIGS. 9 and 11 which will be described later.

Battery equivalent fuel consumption ratio F (a chain dotted line) takes a greater value as a battery charging amount is greater. In a running pattern in which an MG2 regenerative power amount is relatively great, however, an amount of electric power r input to battery 60 is great owing to MG2 regeneration and hence battery equivalent fuel consumption ratio F takes a relatively small value. When battery equivalent fuel consumption ratio F is relatively small, EV switching margin K with which an SOC is converged to the target range is set to a relatively great value as shown in FIG. 7. A value resulting from addition of EV switching margin K to battery equivalent fuel consumption ratio F (a chain dotted line) is set as the EV criterion line (a solid line).

Figure 9:
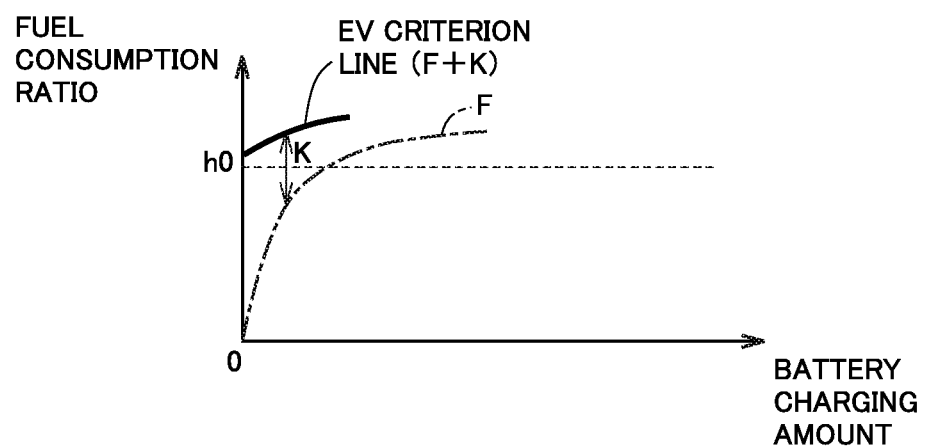
FIG. 9 is a diagram showing one example of correspondence among a battery charging amount, battery equivalent fuel consumption ratio F, and an EV criterion line in a running pattern relatively small in MG2 regenerative power amount.

FIG. 9 is a diagram showing one example of correspondence among a battery charging amount, battery equivalent fuel consumption ratio F, and an EV criterion line (=F+K) in a running pattern relatively small in MG2 regenerative power amount (for example, an example with which the vehicle runs on a highway).

In a running pattern relatively small in MG2 regenerative power amount, amount of electric power r input to battery 60 owing to MG2 regeneration is small and hence battery equivalent fuel consumption ratio F takes a relatively great value. When battery equivalent fuel consumption ratio F takes a relatively great value, EV switching margin K with which an SOC is converged to the target range is set to a relatively small value as shown in FIG. 7. A value resulting from addition of EV switching margin K to battery equivalent fuel consumption ratio F (a chain dotted line) is set as the EV criterion line (a solid line).

Thus, ECU 100 according to the present embodiment sets the "EV criterion line" to a value resulting from addition of EV switching margin K to battery equivalent fuel consumption ratio F (=F+K) instead of simply setting the EV criterion line to battery equivalent fuel consumption ratio F.

A value of EV switching margin K with which an SOC is converged to the target range is varied by battery equivalent fuel consumption ratio F. In the present embodiment, the F-K map which defines correspondence between battery equivalent fuel consumption ratio F and EV switching margin K with which an SOC is converged to the target range is found through experiments or simulations and stored in advance in memory 110.

ECU 100 calculates EV switching margin K in accordance with current battery equivalent fuel consumption ratio F by referring to the F-K map stored in memory 110 and sets a value resulting from addition of EV switching margin K to current battery equivalent fuel consumption ratio F as the EV criterion line. Thus, as compared with an example in which the EV criterion line is simply set to battery equivalent fuel consumption ratio F, a frequency of selection of EV running is lowered and an SOC tends to be converged to the target range. Engine generated electric power and MG2 regenerative power input to battery 60 are appropriately consumed during EV running within a range in which the SOC is not lower than the target range. Since the SOC becoming lower than the target range is thus suppressed, forced turn-on of engine 10 for recovering the SOC is suppressed. Consequently, switching between EV running and engine running can be made to optimize fuel efficiency while the SOC is stabilized within the target range.

When the EV criterion line is set as above, a value resulting from subtraction of "battery equivalent fuel consumption ratio F" representing an equivalent fuel consumption ratio during EV running from "engine fuel consumption ratio h1" representing a fuel consumption ratio during engine running (=h1−F) is employed as a value of EV switching margin K, which means that EV switching margin K is consequently set to a value corresponding to an amount of reduction (a unit of g/kWh) in fuel consumption ratio in EV running.

<Assistance Determination Processing and Setting of Optimal Assistance Criterion Line>

ECU 100 according to the present embodiment selects engine running when requested power Pe is larger than reference power P0. Engine running includes "first engine running" with motor assistance and "second engine running" without motor assistance. In first engine running, optimal discharging control is carried out and a value resulting from subtraction of optimal motor assistance power Pmopt from requested power Pe (=Pe−Pmopt) is output from engine 10. In second engine running, on the other hand, optimal discharging control is not carried out but requested power Pe is output from engine 10. Therefore, during engine running, how to select between first engine running and second engine running is important in improvement in fuel efficiency.

A technique of lowering an SOC with motor assistance (discharging of battery 60) when the SOC exceeds a threshold value has conventionally been available as a technique of determining whether or not to carry out motor assistance. With this technique, however, engine power should forcibly be lowered in order to lower the SOC and fuel efficiency may not be optimized.

ECU 100 performs processing for selecting either first engine running or second engine running (which is hereinafter also referred to as "assistance determination processing") in order to stabilize an SOC within the target range when requested power Pe is larger than reference power P0. Specifically, ECU 100 calculates engine fuel consumption ratio h (which is hereinafter simply also referred to as an "engine fuel consumption ratio h2") on the assumption that second engine running without motor assistance is carried out (that is, engine power is set to "Pe"), and carries out second engine running without motor assistance when engine fuel consumption ratio h2 is smaller than a prescribed threshold value (which is hereinafter also referred to as an "assistance criterion line") and carries out first engine running with motor assistance when engine fuel consumption ratio h2 is larger than the assistance criterion line.

Vehicle fuel consumption amount Q2 in an example in which optimal discharging control is carried out to set engine power to "Pe−Pmopt" (that is, first engine running is carried out) is affected by battery equivalent fuel consumption ratio F as shown in FIG. 6 described above, and an effect of improvement in fuel efficiency owing to motor assistance is lower as battery equivalent fuel consumption ratio F is larger.

In view of this aspect, ECU 100 sets the "assistance criterion line" used for assistance determination processing to a value which is greater with larger battery equivalent fuel consumption ratio F, as a function of battery equivalent fuel consumption ratio F. More specifically, ECU 100 sets the "assistance criterion line" to a value resulting from addition of a prescribed assistance margin Ka to battery equivalent fuel consumption ratio F (=F+Ka).

As a result of running with the assistance criterion line being set to "F+Ka" and switching between first engine running and second engine running being made, an SOC is desirably accommodated in the target range. In the present embodiment, an "F−Ka map" which defines correspondence between battery equivalent fuel consumption ratio F and assistance margin Ka with which an SOC is converged to the target range is stored in advance in memory 110 of ECU 100. The F−Ka map can be obtained by conducting experiments or simulations for each operation pattern different in battery equivalent fuel consumption ratio F to thereby find assistance margin Ka with which an SOC is converged to the target range.

Figure 10:
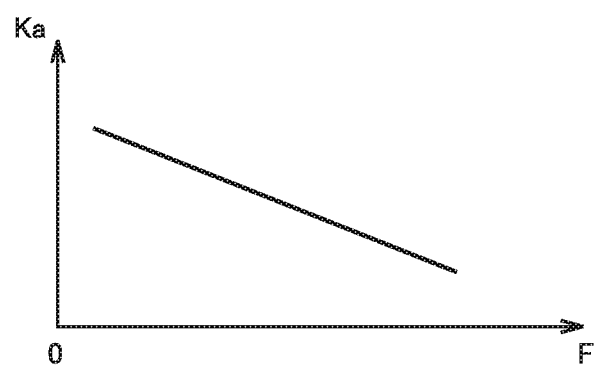
FIG. 10 is a diagram showing one example of an F–Ka map.

FIG. 10 is a diagram showing one example of the F−Ka map. As shown in FIG. 10, assistance margin Ka with which an SOC is converged to the target range has a positive value and has a value smaller with larger battery equivalent fuel consumption ratio F. Such an "F−Ka map" is stored in advance in memory 110.

ECU 100 determines assistance margin Ka in accordance with a current value of battery equivalent fuel consumption ratio F by referring to the F−Ka map (FIG. 10) stored in advance in memory 110. ECU 100 sets a value resulting from addition of assistance margin Ka to battery equivalent fuel consumption ratio F (=F+Ka) as the assistance criterion line.

Figure 11:
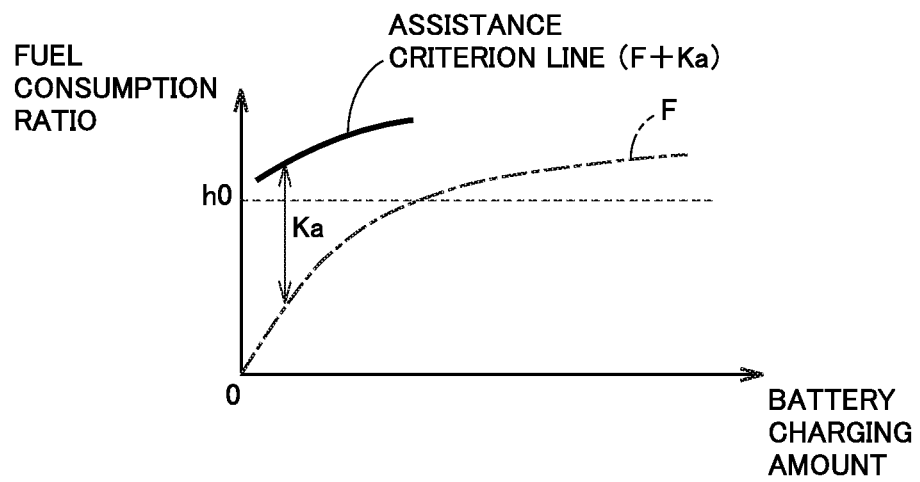
FIG. 11 is a diagram showing one example of correspondence among a battery charging amount resulting from power generation by the engine, battery equivalent fuel consumption ratio F, and an assistance criterion line.

FIG. 11 is a diagram showing one example of correspondence among a battery charging amount as a result of power generation by the engine, battery equivalent fuel consumption ratio F, and an assistance criterion line (=F+Ka). In FIG. 11, the abscissa represents a battery charging amount (a unit of kWh) resulting from power generation by the engine and the ordinate represents a fuel consumption ratio (a unit of g/kWh).

Assistance margin Ka with which an SOC is converged to the target range is set to a positive value which varies with battery equivalent fuel consumption ratio F as shown in FIG. 10. Consequently, the assistance criterion line (a solid line) resulting from addition of assistance margin Ka to battery equivalent fuel consumption ratio F (a chain dotted line) has a value greater than battery equivalent fuel consumption ratio F which varies with battery equivalent fuel consumption ratio F.

When engine fuel consumption ratio h2 on the assumption that second engine running without motor assistance is carried out is smaller than the assistance criterion line, ECU 100 carries out second engine running, and when engine fuel consumption ratio h2 is larger than the assistance criterion line, ECU 100 carries out first engine running with motor assistance. By doing so, switching between first engine running with motor assistance and second engine running without motor assistance can be made to stabilize an SOC in the target range.

<Flowchart of EV Determination Processing and Assistance Determination Processing>

Figure 12:
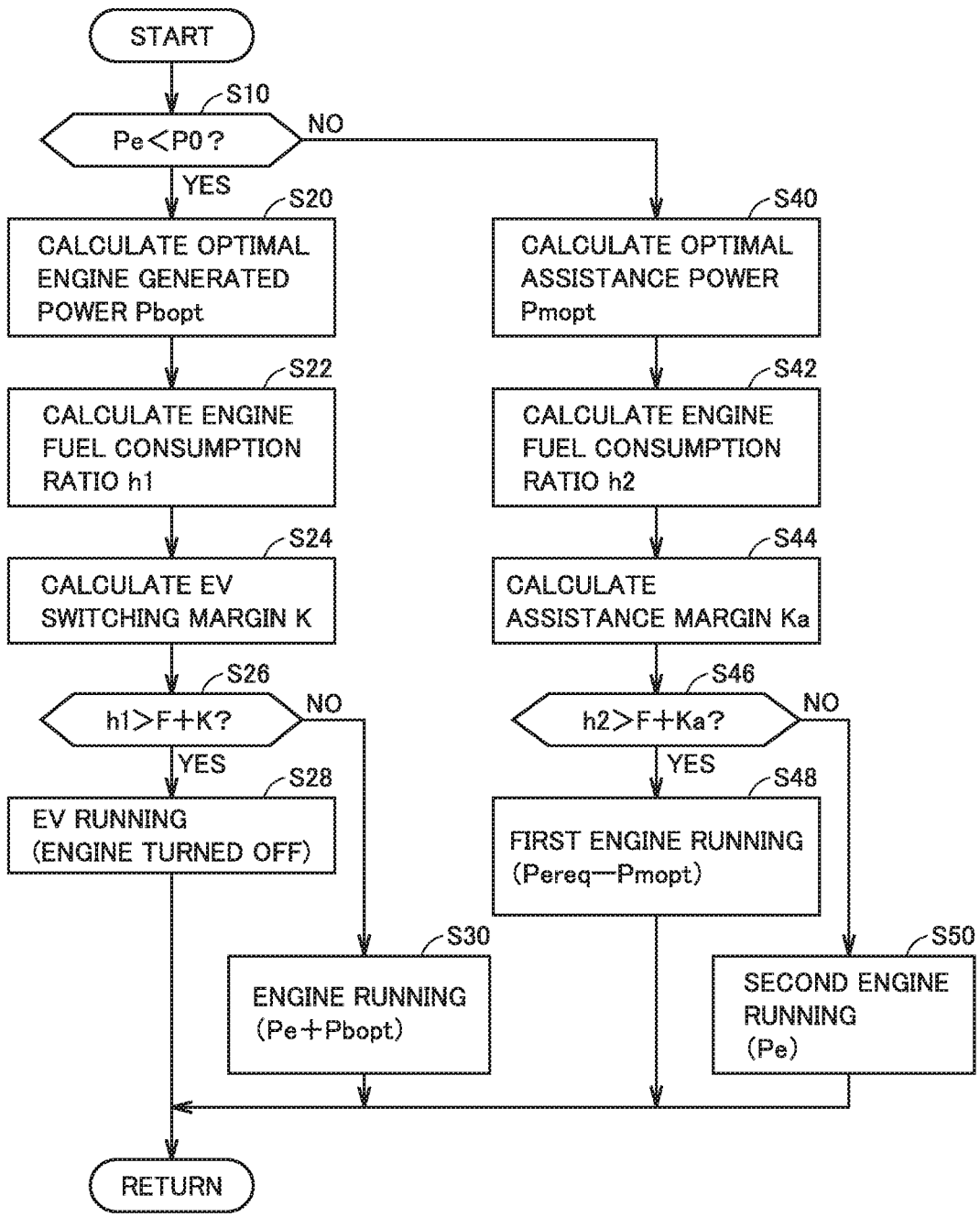
FIG. 12 is a flowchart (No. 2) showing one example of the procedure of processing by the ECU.

FIG. 12 is a flowchart showing one example of the procedure of processing performed when ECU 100 performs EV determination processing and assistance determination processing.

ECU 100 determines whether or not requested power Pe is smaller than reference power P0 (step S10).

When it is determined in step S10 that requested power Pe is smaller than reference power P0 (YES in step S10), ECU 100 calculates optimal engine generated power Pbopt during engine running (step S20).

ECU 100 calculates engine fuel consumption ratio h1 during engine running (that is, "Pe+Pbopt" being set as engine power) (step S22).

ECU 100 calculates EV switching margin K in accordance with current battery equivalent fuel consumption ratio F by referring to the F−K map shown in FIG. 7 (step S24).

ECU 100 determines whether or not engine fuel consumption ratio h1 is larger than the "EV criterion line" resulting from addition of EV switching margin K to current battery equivalent fuel consumption ratio F (step S26).

When it is determined in step S26 that engine fuel consumption ratio h1 is larger than the EV criterion line (=F+K) (YES in step S26), ECU 100 turns off engine 10 and carries out EV running (step S28).

When it is determined in step S26 that engine fuel consumption ratio h1 is not larger than the EV criterion line (=F+K) (NO in step S26), ECU 100 turns on engine 10 and carries out engine running (step S30). ECU 100 controls engine power based on optimal charging control described above. ECU 100 sets a value resulting from addition of optimal engine generated power Pbopt to requested power Pe as engine power.

When it is determined in step S10 that requested power Pe is not smaller than reference power P0 (NO in step S10), ECU 100 calculates optimal assistance power Pmopt during first engine running with motor assistance (step S40).

ECU 100 calculates engine fuel consumption ratio h2 during second engine running without motor assistance (that is, requested power Pe being set as engine power) (step S42).

ECU 100 calculates assistance margin Ka in accordance with current battery equivalent fuel consumption ratio F by referring to the F−Ka map shown in FIG. 10 (step S44).

ECU 100 determines whether or not engine fuel consumption ratio h2 is larger than the "assistance criterion line" resulting from addition of assistance margin Ka to current battery equivalent fuel consumption ratio F (step S46).

When it is determined in step S46 that engine fuel consumption ratio h2 is larger than the assistance criterion line (=F+Ka) (YES in step S46), ECU 100 carries out first engine running with motor assistance (step S48). ECU 100 controls engine power based on optimal discharging control described above. ECU 100 sets a result of subtraction of optimal assistance power Pmopt from requested power Pe as engine power in order to carry out motor assistance at optimal fuel efficiency.

When it is determined in step S46 that engine fuel consumption ratio h2 is not larger than the assistance criterion line (=F+Ka) (NO in step S46), ECU 100 carries out second engine running without motor assistance (step S50). ECU 100 sets requested power Pe as engine power.

As set forth above, ECU 100 according to the present embodiment sets the "EV criterion line" to be compared with engine fuel consumption ratio h1 in EV determination processing to a value resulting from addition of EV switching margin K to battery equivalent fuel consumption ratio F (=F+K) instead of simply setting the EV criterion line to battery equivalent fuel consumption ratio F. ECU 100 calculates EV switching margin K in accordance with current battery equivalent fuel consumption ratio F by referring to the F–K map stored in memory 110 and sets a value resulting from addition of EV switching margin K to current battery equivalent fuel consumption ratio F as the EV criterion line. The F–K map is information obtained through experiments or simulations which defines correspondence between battery equivalent fuel consumption ratio F and EV switching margin K with which an SOC is converged to the target range. Therefore, as compared with an example in which the EV criterion line is simply set to battery equivalent fuel consumption ratio F, a frequency of selection of EV running is lowered and an SOC tends to be converged to the target range. Consequently, switching between EV running and engine running can be made to optimize fuel efficiency while an SOC is stabilized in the target range.

ECU 100 according to the present embodiment sets the "assistance criterion line" to be compared with engine fuel consumption ratio h2 in assistance determination processing as a function of battery equivalent fuel consumption ratio F. Specifically, ECU 100 calculates assistance margin Ka in accordance with current battery equivalent fuel consumption ratio F by referring to the F–Ka map stored in memory 110 and sets a value resulting from addition of assistance margin Ka to current battery equivalent fuel consumption ratio F as the assistance criterion line. The F–Ka map is information obtained through experiments or simulations which defines correspondence between battery equivalent fuel consumption ratio F and assistance margin Ka with which an SOC is converged to the target range. Thus, switching between first engine running with motor assistance and second engine running without motor assistance can be made to optimize fuel efficiency while an SOC is stabilized in the target range.

[First Modification]

Though an example in which both of EV determination processing and assistance determination processing are performed is described in the embodiment above, EV determination processing may be performed without performing assistance determination processing.

Figure 13:
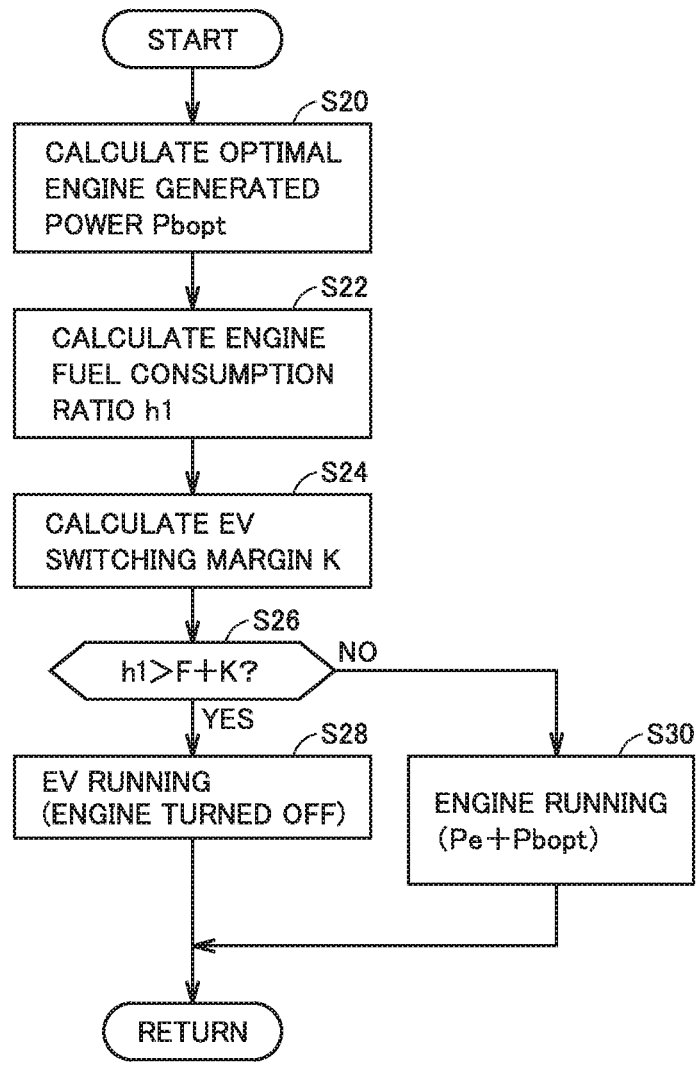
FIG. 13 is a flowchart (No. 3) showing one example of the procedure of processing by the ECU.

FIG. 13 is a flowchart showing one example of the procedure of processing when ECU 100 performs EV determination processing without performing assistance determination processing. The flowchart in FIG. 13 is the same as the flowchart in FIG. 12 from which processing in step S10 and steps S40 to S50 is removed.

ECU 100 calculates EV switching margin K in accordance with current battery equivalent fuel consumption ratio F (step S24) and determines whether or not engine fuel consumption ratio h1 is larger than the "EV criterion line" resulting from addition of EV switching margin K to current battery equivalent fuel consumption ratio F (step S26). When engine fuel consumption ratio h1 is larger than the EV criterion line (=F+K) (YES in step S26), ECU 100 carries out EV running (step S28), and when engine fuel consumption ratio h1 is smaller than the EV criterion line (=F+K) (NO in step S26), ECU 100 carries out engine running (step S30).

Switching between EV running and engine running can thus be made to optimize fuel efficiency while an SOC is stabilized in the target range.

[Second Modification]

Though an example in which EV determination processing is performed without performing assistance determination processing is described in the first modification above, assistance determination processing may be performed without performing EV determination processing on the contrary.

Figure 14:
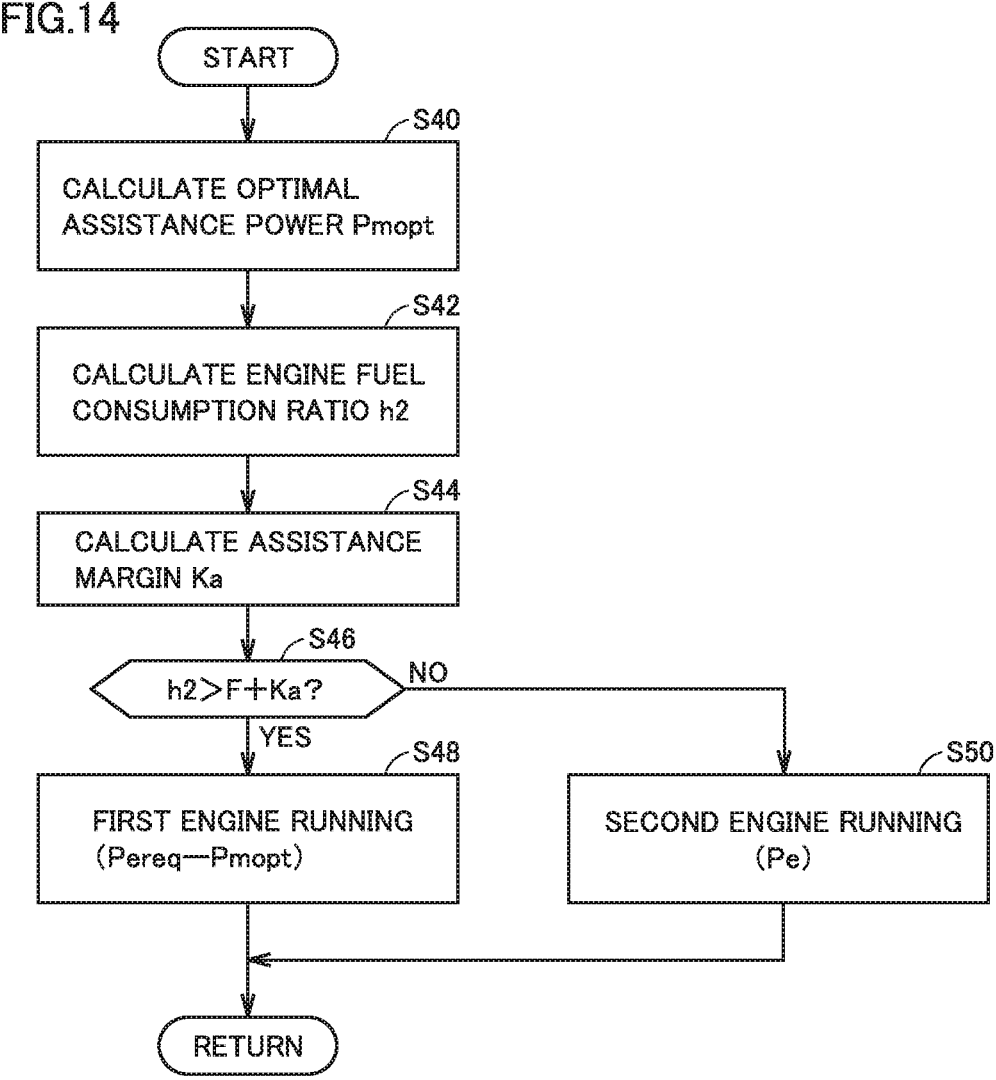
FIG. 14 is a flowchart (No. 4) showing one example of the procedure of processing by the ECU.

FIG. 14 is a flowchart showing one example of the procedure of processing when ECU 100 performs assistance determination processing without performing EV determination processing. The flowchart in FIG. 14 is the same as the flowchart in FIG. 12 from which processing in steps S10 to S30 is removed.

ECU 100 calculates assistance margin Ka in accordance with current battery equivalent fuel consumption ratio F (step S44) and determines whether or not engine fuel consumption ratio h2 is larger than the "assistance criterion line" resulting from addition of assistance margin Ka to current battery equivalent fuel consumption ratio F (step S46). When engine fuel consumption ratio h2 is larger than the assistance criterion line (=F+Ka) (YES in step S46), ECU 100 carries out first engine running (step S48), and when engine fuel consumption ratio h2 is smaller than the assistance criterion line (=F+Ka) (NO in step S46), ECU 100 carries out second engine running (step S50).

Switching between first engine running with motor assistance and second engine running without motor assistance can thus be made to optimize fuel efficiency while an SOC is stabilized in the target range.

[Third Modification]

In the embodiment described above, in EV determination processing, a value resulting from addition of EV switching margin K to battery equivalent fuel consumption ratio F is set as the EV criterion line and switching between EV running and engine running is made based on a result of comparison between engine fuel consumption ratio h1 and the EV criterion line (=F+K), so that an SOC is stabilized in the target range.

EV switching margin K included in the EV criterion line, however, is strictly a value found through experiments or simulations. Therefore, an SOC may be out of the target range depending on an actual state of running. In view of this aspect, in the present third modification, the EV criterion line is modified in accordance with an SOC in order to converge the SOC to the target range.

In the embodiment described above, in assistance determination processing, a value resulting from addition of assistance margin Ka to battery equivalent fuel consumption ratio F is set as the assistance criterion line and switching between first engine running and second engine running is made based on a result of comparison between engine fuel consumption ratio h2 and the assistance criterion line (=F+Ka), so that an SOC is stabilized in the target range.

Assistance margin Ka included in the assistance criterion line, however, is strictly a value found through experiments or simulations. Therefore, the SOC may deviate from the target range depending on an actual state of running. In view of this aspect, in the present third modification, the assistance criterion line is modified in accordance with the SOC in order to converge the SOC to the target range.

One example of a technique of modifying the EV criterion line and a technique of modifying the assistance criterion line will specifically be described below.

<Modification of EV Criterion Line with SOC>

ECU 100 calculates an amount of modification δ to EV switching margin K in accordance with an SOC when the SOC is out of the target range, and sets a value "K+δ" resulting from addition of amount of modification δ to EV switching margin K found in the F–K map shown in FIG. 7 as a modified EV switching margin. Consequently, the modified EV criterion line is expressed as "F+K+δ".

Figure 15:
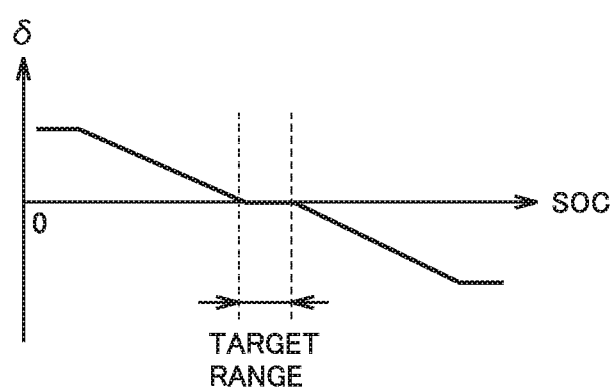
FIG. 15 is a diagram showing one example of correspondence between an SOC and an amount of modification δ to the EV criterion line.

FIG. 15 is a diagram showing one example of correspondence between an SOC and amount of modification δ to the EV criterion line. As shown in FIG. 15, when an SOC is higher than the target range, amount of modification δ is set to a negative value and an absolute value of amount of modification δ is set to a greater value as the SOC is higher. When the SOC is lower than the target range, amount of modification δ is set to a positive value and an absolute value of amount of modification δ is set to a greater value with the SOC is lower. When the SOC is within the target range, amount of modification δ is set to "0". Information showing correspondence as shown in FIG. 15 is stored in memory 110. ECU 100 calculates amount of modification δ corresponding to an SOC by referring to this information.

Figure 16:
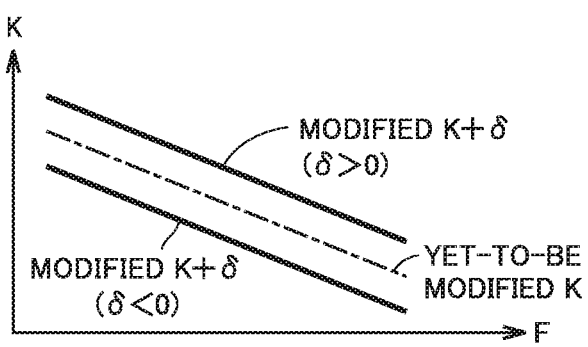
FIG. 16 is a diagram showing one example of correspondence among battery equivalent fuel consumption ratio F, a yet-to-be modified EV switching margin "K", and a modified EV switching margin "K+δa".

FIG. 16 is a diagram showing one example of correspondence among battery equivalent fuel consumption ratio F, a yet-to-be modified EV switching margin "K", and a modified EV switching margin "K+δ".

When an SOC is higher than the target range, amount of modification δ has a negative value as shown in FIG. 15. Therefore, the modified EV switching margin "K+δ" has a value smaller than yet-to-be modified EV switching margin "K" as shown in FIG. 16. Thus, since the "EV criterion line" to be compared with engine fuel consumption ratio h1 in EV determination processing is lowered, a region where EV running is carried out is expanded and an SOC lowers toward the target range.

When the SOC is lower than the target range, amount of modification δ has a positive value as shown in FIG. 15. Therefore, the modified EV switching margin "K+δ" has a value greater than yet-to-be modified EV switching margin "K" as shown in FIG. 16. Thus, since the "EV criterion line" to be compared with engine fuel consumption ratio h1 in EV determination processing is increased, a region where engine running accompanying power generation by the engine is carried out is expanded and the SOC increases toward the target range.

By thus modifying the EV criterion line in accordance with an actual SOC, the SOC can more appropriately be stabilized in the target range.

Though a method of adding amount of modification δ in accordance with an SOC is shown in the example above as a technique of modifying the EV criterion line, a technique of multiplication by a modification coefficient in accordance with an SOC may be adopted.

<Modification of Assistance Criterion Line with SOC>

When an SOC is out of the target range, ECU 100 calculates an amount of modification δa to assistance margin Ka in accordance with an SOC, and sets a value "Ka+δa" resulting from addition of amount of modification δa to assistance margin Ka found in the F-Ka map shown in FIG. 10 as a modified assistance margin. Consequently, the modified assistance criterion line is expressed as "F+Ka+δa".

Figure 17:
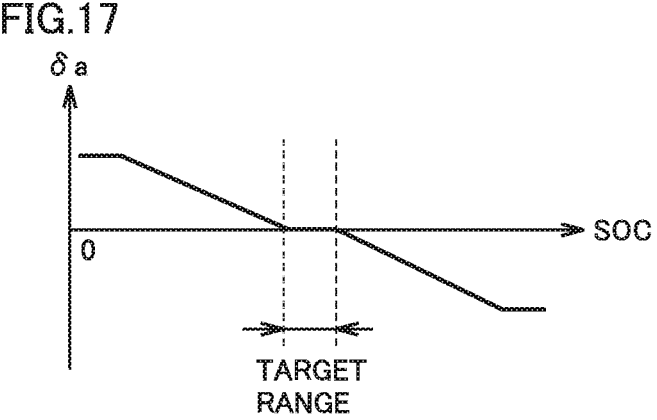
FIG. 17 is a diagram showing one example of correspondence between an SOC and an amount of modification δa to an assistance criterion line.

FIG. 17 is a diagram showing one example of correspondence between an SOC and amount of modification δa to an assistance criterion line. As shown in FIG. 17, when an SOC is higher than the target range, amount of modification δa has a negative value and an absolute value of amount of modification δa is set to a greater value with the SOC is higher. When an SOC is lower than the target range, amount of modification δa has a positive value and an absolute value of amount of modification δa is set to a greater value with the SOC is lower. When an SOC is within the target range, amount of modification δa is set to "0". Information on correspondence as shown in FIG. 17 is stored in memory 110. ECU 100 calculates amount of modification δa corresponding to an SOC by referring to this information.

Figure 18:
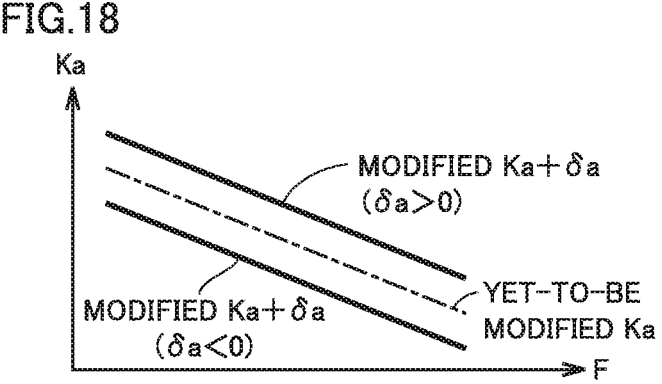
FIG. 18 is a diagram showing one example of correspondence among battery equivalent fuel consumption ratio F, a yet-to-be modified assistance margin "Ka", and a modified assistance margin "Ka+δa".

FIG. 18 is a diagram showing one example of correspondence among battery equivalent fuel consumption ratio F, yet-to-be modified assistance margin "Ka", and modified assistance margin "Ka+δa".

When an SOC is higher than the target range, amount of modification δa has a negative value as shown in FIG. 17. Therefore, modified assistance margin "Ka+δa" has a value smaller than yet-to-be modified assistance margin "Ka" as shown in FIG. 18. Since the "assistance criterion line" to be compared with engine fuel consumption ratio h2 in assistance determination processing is thus lowered, a region where first engine running with motor assistance is carried out is expanded and an SOC lowers toward the target range.

When an SOC is lower than the target range, amount of modification δa has a positive value as shown in FIG. 17. Therefore, modified assistance margin "Ka+δa" has a value greater than yet-to-be modified assistance margin "Ka" as shown in FIG. 18. Since the "assistance criterion line" to be compared with engine fuel consumption ratio h2 in assistance determination processing is thus increased, a region where second engine running without motor assistance is carried out is expanded and an SOC increases toward the target range owing to power generation by the engine during second engine running.

By thus modifying the assistance criterion line in accordance with an actual SOC, the SOC can more appropriately be stabilized in the target range.

Though a method of adding amount of modification δa in accordance with an SOC is shown in the example above as a technique of modifying the assistance criterion line, a technique of multiplication by a modification coefficient in accordance with an SOC may be adopted.

<Flowchart>

Figure 19:
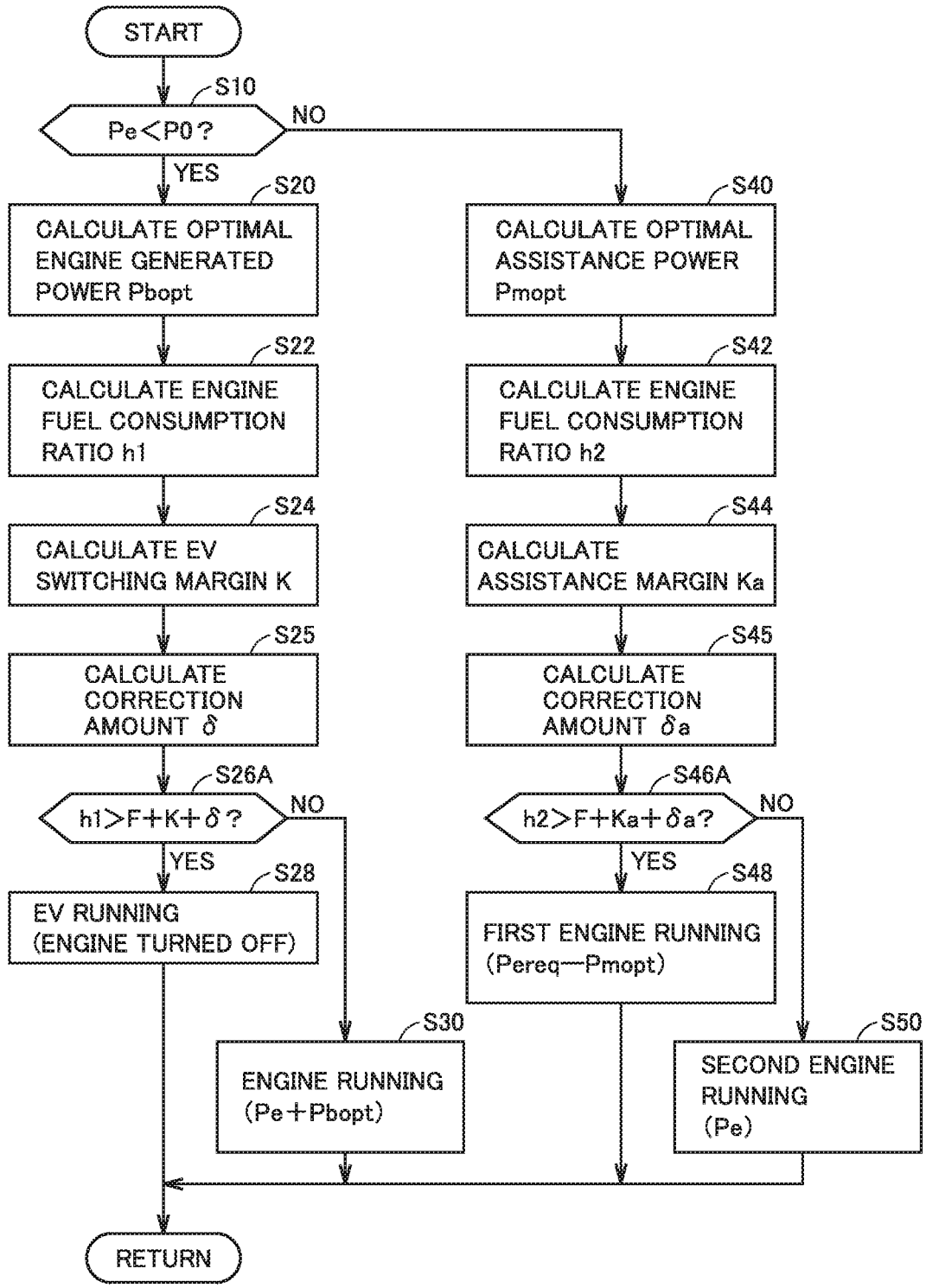
FIG. 19 is a flowchart (No. 5) showing one example of the procedure of processing by the ECU.

FIG. 19 is a flowchart showing one example of the procedure of processing when ECU 100 according to the present third modification performs EV determination processing and assistance determination processing. The flowchart in FIG. 19 is the same as the flowchart in FIG. 12 to which processing in steps S25 and S45 is added and in which processing in steps S26 and S46 is changed to that in steps S26A and S46A. Since other steps (steps the same in number as the steps shown in FIG. 12 described previously) have already been described, detailed description will not be repeated here.

After ECU 100 calculates EV switching margin K by referring to the F-K map in step S24, it calculates amount of modification δ to EV switching margin K in accordance with an SOC by referring to information on correspondence shown in FIG. 15 (step S25). ECU 100 determines whether or not engine fuel consumption ratio h1 is larger than the "EV criterion line" resulting from addition of EV switching margin K and amount of modification δ to current battery equivalent fuel consumption ratio F (step S26A).

When engine fuel consumption ratio h1 is larger than the EV criterion line (=F+K+δ) (YES in step S26A), ECU 100 carries out EV running (step S28), and otherwise (NO in step S26A), it carries out engine running (step S30).

After ECU 100 calculates assistance margin Ka by referring to the F-Ka map in step S44, it calculates amount of modification δa to assistance margin Ka in accordance with an SOC by referring to information on correspondence shown in FIG. 17 (step S45). ECU 100 determines whether or not engine fuel consumption ratio h2 is larger than the "assistance criterion line" resulting from addition of assistance margin Ka and amount of modification δa to current battery equivalent fuel consumption ratio F (step S46A).

When engine fuel consumption ratio h2 is larger than the assistance criterion line (=F+Ka+δa) (YES in step S46A), ECU 100 carries out first engine running (step S48), and otherwise (NO in step S46A), it carries out second engine running (step S50).

As set forth above, ECU 100 according to the present third modification modifies the EV criterion line and the assistance criterion line in accordance with an actual SOC so as to converge the SOC to the target range. Therefore, the SOC can more appropriately be stabilized in the target range.

The embodiment and the first to third modifications thereof described above can also be combined as appropriate within the technically consistent scope.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A hybrid vehicle comprising:
an engine mechanically connected to a drive wheel;
a motor generator mechanically connected to the drive wheel and the engine;
a battery electrically connected to the motor generator;
a control device configured to select between electrical running and engine running by using an engine fuel consumption ratio and a battery equivalent fuel consumption ratio,
in the electrical running, the vehicle runs with the engine off,
in the engine running, the vehicle runs with the engine on,
the engine fuel consumption ratio representing a ratio of an amount of fuel consumption by the engine to an amount of energy generation by the engine,
the battery equivalent fuel consumption ratio representing a ratio of an amount of fuel consumed by the engine for charging of the battery to an amount of power storage in the battery,
when power requested by a user is smaller than a reference power at which the engine fuel consumption ratio is smallest, the control device being configured to
calculate optimal charging power for the battery during the engine running,
calculate the engine fuel consumption ratio as a first engine fuel consumption ratio when the engine outputs power resulting from addition of the optimal charging power to the requested power,
calculate a first margin in accordance with the battery equivalent fuel consumption ratio, and
select the electrical running when the first engine fuel consumption ratio is larger than a first criterion value obtained by addition of the first margin to the battery equivalent fuel consumption ratio and select the engine running when the first engine fuel consumption ratio is smaller than the first criterion value; and
a storage which stores first information which defines correspondence between the battery equivalent fuel consumption ratio and the first margin with which an SOC of the battery is converged to a target range,
the control device being configured to calculate the first margin by referring to the first information stored in the storage.

2. The hybrid vehicle according to claim 1, wherein
the control device is configured to perform first correction processing to decrease the first criterion value when the SOC of the battery is higher than the target range and to increase the first criterion value when the SOC of the battery is lower than the target range.

3. The hybrid vehicle according to claim 1, wherein
when the requested power is larger than the reference power, the control device is configured to
calculate the engine fuel consumption ratio when the engine outputs the requested power as a second engine fuel consumption ratio,
calculate a second margin in accordance with the battery equivalent fuel consumption ratio, and
select first engine running with assistance by the motor generator when the second engine fuel consumption ratio is larger than a second criterion value obtained by addition of the second margin to the battery equivalent fuel consumption ratio and select second engine running without assistance by the motor generator when the second engine fuel consumption ratio is smaller than the second criterion value,
the storage stores second information which defines correspondence between the battery equivalent fuel consumption ratio and the second margin with which the SOC of the battery is converged to the target range, and
the control device is configured to calculate the second margin by referring to the second information stored in the storage.

4. The hybrid vehicle according to claim 3, wherein
the control device is configured to perform second correction processing to decrease the second criterion value when the SOC of the battery is higher than the target range and to increase the second criterion value when the SOC of the battery is lower than the target range.

5. A hybrid vehicle comprising:
an engine mechanically connected to a drive wheel;
a motor generator mechanically connected to the drive wheel and the engine;
a battery electrically connected to the motor generator;
a control device configured to select between electrical running and engine running by using an engine fuel consumption ratio and a battery equivalent fuel consumption ratio,
in the electrical running, the vehicle runs with the engine off,
in the engine running, the vehicle runs with the engine on,
the engine fuel consumption ratio representing a ratio of an amount of fuel consumption by the engine to an amount of energy generation by the engine,
the battery equivalent fuel consumption ratio representing a ratio of an amount of fuel consumed by the engine for charging of the battery to an amount of power storage in the battery,
the control device being configured to
calculate optimal charging power for the battery during the engine running,
calculate the engine fuel consumption ratio as a first engine fuel consumption ratio when the engine outputs power resulting from addition of the optimal charging power to power requested by a user,
calculate a margin in accordance with the battery equivalent fuel consumption ratio, and
select the electrical running when the first engine fuel consumption ratio is larger than a criterion value obtained by addition of the margin to the battery equivalent fuel consumption ratio and select the engine running when the first engine fuel consumption ratio is smaller than the criterion value; and a storage which stores first information which defines correspondence between the battery equivalent fuel consumption ratio and the margin with which an SOC of the battery is converged to a target range, the control device being configured to calculate the margin by referring to the first information stored in the storage.

6. The hybrid vehicle according to claim 5, wherein the control device is configured to perform correction processing to decrease the criterion value when the SOC of the battery is higher than the target range and to increase the criterion value when the SOC of the battery is lower than the target range.

7. A hybrid vehicle comprising:

an engine mechanically connected to a drive wheel;

a motor generator mechanically connected to the drive wheel and the engine;

a battery electrically connected to the motor generator;

a control device configured to select between first engine running with assistance by the motor generator and second engine running without assistance by the motor generator, by using an engine fuel consumption ratio and a battery equivalent fuel consumption ratio, the engine fuel consumption ratio representing a ratio of an amount of fuel consumption by the engine to an amount of energy generation by the engine, the battery equivalent fuel consumption ratio representing a ratio of an amount of fuel consumed by the engine for charging of the battery to an amount of power storage in the battery, the control device being configured to calculate an engine fuel consumption ratio during the second engine running, calculate a margin in accordance with the battery equivalent fuel consumption ratio, and select the first engine running when the engine fuel consumption ratio during the second engine running is larger than a criterion value obtained by addition of the margin to the battery equivalent fuel consumption ratio and select the second engine running when the engine fuel consumption ratio during the second engine running is smaller than the criterion value; and a storage which stores information which defines correspondence between the battery equivalent fuel consumption ratio and the margin with which an SOC of the battery is converged to a target range, the control device being configured to calculate the margin by referring to the information stored in the storage.

8. The hybrid vehicle according to claim 7, wherein the control device is configured to perform correction processing to decrease the criterion value when the SOC of the battery is higher than the target range and to increase the criterion value when the SOC of the battery is lower than the target range.

* * * * *